(12) United States Patent
Sun et al.

(10) Patent No.: US 11,381,334 B2
(45) Date of Patent: Jul. 5, 2022

(54) SERVICE SIGNAL TRANSMISSION METHOD AND APPARATUS

(71) Applicant: HUAWEI TECHNOLOGIES CO., LTD., Shenzhen (CN)

(72) Inventors: Desheng Sun, Shenzhen (CN); Sihai Guan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/092,208

(22) Filed: Nov. 6, 2020

(65) Prior Publication Data

US 2021/0058186 A1 Feb. 25, 2021

Related U.S. Application Data

(63) Continuation of application No. PCT/CN2019/085696, filed on May 6, 2019.

(30) Foreign Application Priority Data

May 7, 2018 (CN) .......................... 201810427846.1

(51) Int. Cl.
*H04L 1/00* (2006.01)
*H04J 3/16* (2006.01)
(52) U.S. Cl.
CPC .......... *H04J 3/1658* (2013.01); *H04L 1/0058* (2013.01); *H04L 1/0083* (2013.01);
(Continued)
(58) Field of Classification Search
CPC ... H04L 1/0002; H04L 1/0083; H04L 1/0058; H04L 1/0008
See application file for complete search history.

(56) References Cited

U.S. PATENT DOCUMENTS

| 7,673,213 B2 * | 3/2010 | Chugg .............. H03M 13/2945 |
| | | 714/755 |
| 2009/0037792 A1 * | 2/2009 | Choi ...................... H04L 1/007 |
| | | 714/755 |

(Continued)

FOREIGN PATENT DOCUMENTS

| CN | 1792043 A | 6/2006 |
| CN | 101013961 A | 8/2007 |

(Continued)

OTHER PUBLICATIONS

Huawei,"Ultra-Low Latency Ethernet Ethernet Everywhere, Network Technology Lab of 2012 Labs", Jun. 2016, total 11 pages.

(Continued)

*Primary Examiner* — Dzung D Tran

(57) ABSTRACT

This application discloses a service signal transmission method and apparatus, and belongs to the field of communications technologies. The method includes: obtaining, by a first network device, N first service signals, where coding types of the N first service signals are the same, and at least two of the N first service signals have different transmission rates, where N≥2; inserting padding signals into the N first service signals, to obtain N second service signals, where transmission rates of the N second service signals are integer multiples of a reference rate; and multiplexing the N second service signals into one third service signal, and sending the third service signal to a second network device. In this application, the padding signals are inserted into the N first service signals, to obtain the N second service signals whose transmission rates have an obvious integer-ratio characteristic.

18 Claims, 12 Drawing Sheets

(52) U.S. Cl.
CPC ..... *H04J 2203/0085* (2013.01); *H04L 1/0002* (2013.01); *H04L 1/0008* (2013.01)

(56) References Cited

U.S. PATENT DOCUMENTS

| | | | |
|---|---|---|---|
| 2009/0052585 A1* | 2/2009 | Song | H04L 1/0065 375/340 |
| 2010/0080245 A1 | 4/2010 | Kisaka et al. | |
| 2015/0078406 A1* | 3/2015 | Caggioni | H04J 3/1664 370/537 |
| 2020/0322084 A1 | 10/2020 | Zhang et al. | |

FOREIGN PATENT DOCUMENTS

| | | |
|---|---|---|
| CN | 101035143 A | 9/2007 |
| CN | 101094399 A | 12/2007 |
| CN | 101378399 A | 3/2009 |
| CN | 101507155 A | 8/2009 |
| CN | 101577598 A | 11/2009 |
| CN | 102325343 A | 1/2012 |
| CN | 104113389 A | 10/2014 |
| CN | 104993902 A | 10/2015 |
| CN | 105790883 A | 7/2016 |
| CN | 105871502 A | 8/2016 |
| CN | 106330417 A | 1/2017 |
| CN | 106506110 A | 3/2017 |
| CN | 106817211 A | 6/2017 |
| DE | 102016007576 B3 | 11/2017 |
| EP | 2106051 A1 | 9/2009 |
| JP | S61133736 A | 6/1986 |
| JP | S6266737 A | 3/1987 |
| JP | H11163938 A | 6/1999 |
| KR | 20110049728 A | 5/2011 |
| KR | 20120056643 A | 6/2012 |
| WO | 2008087975 A1 | 7/2008 |

OTHER PUBLICATIONS

IA OIF-FLEXE-01.0, Flex Ethernet Implementation Agreement, Mar. 2016, total 31 pages.
Steve Trowbridge et al.,"PCS/PMA Architecture and OTN Support Proposal P802.3bs 400 Gb/s Ethernet Task Force", May 2014, total 27 pages.
IEEE Std 802.3-2015, IEEE Standard for Ethernet Section Six, Copyright 2016 IEEE. All rights reserved, total 699 pages.
M. Sorbara et al., "Constellation time division multiplexing for the 6 Mb/s ADSL", Proceedings of ICC/SUPERCOMM94—1994 International Conference on Communications, May 1-5, 1994, 5 pages.
Extended European Search Report, dated Apr. 14, 2021, issued in EP Application No. 19800217.2, total 11 pages.
Office Action issued in KR10-2020-7034861, dated Nov. 29, 2021, 11 pages.
Office Action issued in JP 2020-562770, dated Jan. 18, 2022, 10 pages.

\* cited by examiner

| 10 | 0×1E | /I/(0×00) | /I/(0×00) | /I/(0×00) | /I/(0×00) | /I/(0×00) | /I/(0×00) | /I/(0×00) | /I/(0×00) |

FIG. 12

| 10 | 0 × 4B | D1 | D2 | D3 | 0 × 8 | C4 | C5 | C6 | C7 |

SERVICE SIGNAL TRANSMISSION METHOD AND APPARATUS

CROSS-REFERENCE TO RELATED APPLICATIONS

This application is a continuation of International Application No. PCT/CN2019/085696, filed on May 6, 2019, which claims priority to Chinese Patent Application No. 201810427846.1, filed on May 7, 2018, The disclosures of the aforementioned applications are hereby incorporated by reference in their entireties.

TECHNICAL FIELD

This application relates to the field of communications technologies, and in particular, to a service signal transmission method and apparatus.

BACKGROUND

In an existing communications network, a service signal usually needs to be transmitted between ends. For example, a networking structure of the communications network usually includes a plurality of network devices. In a specific service scenario, a service signal usually needs to be transmitted between a first network device and a second network device. The first network device and a second network device may be any two of the plurality of network devices, and there may further be M third network devices between the first network device and the second network device (M≥0).

In a related technology, for a plurality of service signals that have a same coding type, the first network device needs to separately send the plurality of service signals to the second network device. For example, in the existing communications network, a fixed communications channel is usually used to carry a service signal, and the first network device may separately send the plurality of service signals to the second network device through a plurality of corresponding communications channels. The communications channel refers to an end-to-end transmission resource used to carry the service signal, and may specifically be an optical channel data unit/optical channel payload unit (Optical Channel Data Unit/Optical Channel Payload Unit, ODU/OPU), a timeslot, a frame structure, or the like of an optical network (Optical Transport Network). In actual application, the first network device can support a plurality of communications channels, where the plurality of communications channels are used to transmit service signals that have a same coding type, and have different bandwidths. A bandwidth of each communications channel is a maximum transmission rate at which the communications channel can carry a service signal. In addition, the communications channels supported by the first network device are in a one-to-one correspondence with the service signals. In other words, each communications channel can transmit only one type of service signal at a time, and can transmit only a service signal whose transmission rate is less than or equal to a bandwidth of the communications channel. Therefore, the plurality of service signals need to be respectively transmitted through the plurality of corresponding communications channels.

Because the plurality of service signals need to be respectively transmitted, transmission efficiency is relatively low, and transmission resources are wasted. For example, when the plurality of service signals are respectively transmitted through the plurality of communications channels, for one communications channel, if a transmission rate of a service signal transmitted through the communications channel is far less than a bandwidth of the communications channel, signal carrying efficiency of the communications channel is relatively low, and channel resources are greatly wasted.

SUMMARY

To resolve a prior-art problem of relatively low transmission efficiency and a waste of transmission resources, this application provides a service transmission method and apparatus. The technical solutions are as follows.

According to a first aspect, a service transmission method is provided, where the method includes:

obtaining N first service signals, where coding types of the N first service signals are the same, at least two of the N first service signals have different transmission rates, and N is an integer greater than or equal to 2;

inserting padding signals into the N first service signals, to obtain N second service signals that are in a one-to-one correspondence with the N first service signals, where transmission rates of the N second service signals are integer multiples of a reference rate; and multiplexing the N second service signals into one third service signal, and sending the third service signal to a second network device.

In other words, for the N first service signals that have a same coding type and in which the at least two first service signals have different transmission rates, the padding signals may be inserted into the N first service signals, to obtain the N second service signals that are in a one-to-one correspondence with the N first service signals. Then, the N second service signals are multiplexed into one third service signal, and the third service signal is sent to the second network device.

The transmission rates of the N second service signals are integer multiples of the reference rate. In other words, the transmission rates of the N second service signals have an obvious integer-ratio characteristic. The padding signals are inserted into the N first service signals, to obtain the N second service signals whose corresponding transmission rates have an obvious integer-ratio characteristic. This can facilitate subsequent multiplex transmission of the N second service signals that have the obvious integer-ratio characteristic, and resolve a problem of multiplexing service signals with different transmission rates. The N second service signals obtained by performing padding on the N first service signals are multiplexed into one third service signal. This implements multiplex transmission of the N first service signals. In comparison with a separate transmission manner in a related technology, in this application, service signal transmission efficiency is improved, and occupied transmission resources are reduced.

Optionally, the inserting padding signals into the N first service signals, to obtain N second service signals that are in a one-to-one correspondence with the N first service signals includes:

for a first service signal A in the N first service signals, inserting a padding signal into the first service signal A based on a transmission rate of the first service signal A and the reference rate, to obtain a second service signal corresponding to the first service signal A.

Based on the transmission rate of the first service signal A and the reference rate, the padding signal is inserted into the first service signal A. This can ensure that a transmission rate of the second service signal corresponding to the first service signal A is an integer multiple of the reference rate.

Optionally, the inserting a padding signal into the first service signal A based on a transmission rate of the first service signal A and the reference rate, to obtain a second service signal corresponding to the first service signal A includes:

determining X based on the transmission rate of the first service signal A, where X is a quantity of first signal units obtained in a unit time, and the first signal unit is a signal unit of the first service signal A;

determining Y based on the transmission rate of the first service signal A and the reference rate, where Y is a quantity of second signal units that need to be inserted into a group of first signal units obtained in a unit time, and the second signal unit is a signal unit of the padding signal; and in a process of obtaining a group of first signal units in each unit time, inserting Y second signal units into X first signal units obtained in each unit time.

Optionally, the inserting Y second signal units into X first signal units obtained in each unit time includes:

in a process of obtaining a group of first signal units in a current unit time, when X first signal units are obtained, inserting Y second signal units after the obtained X first signal units.

In this embodiment of the present invention, operations of obtaining the first signal unit and inserting the second signal unit need to be performed only once in each unit time. In this way, a quantity of signal obtaining and insertion times can be reduced, an operation is simple, and efficiency is relatively high.

Optionally, the inserting Y second signal units into X first signal units obtained in each unit time includes:

when X is greater than or equal to Y, rounding up a ratio of X to Y to obtain R; in a process of obtaining a group of first signal units in a current unit time, each time R first signal units are obtained, inserting one second signal unit after the obtained R first signal units; and when last S first signal units are obtained in the current unit time, inserting one second signal unit after the obtained last S first signal units, where S is less than or equal to R; and when X is less than Y, rounding up a ratio of Y to X to obtain P; in a process of obtaining a group of first signal units in a current unit time, each time one first signal unit is obtained, inserting P second signal units after the obtained first signal unit; and when the last first signal unit is obtained in the current unit time, inserting Q second signal units after the obtained last first signal unit, where Q is a difference between Y and a quantity of inserted second signal units in the current unit time.

In this embodiment of the present invention, except for the last insertion operation in a unit time, first signal units obtained all times are the same and second signal units inserted all times are the same. This improves evenness of inserting the padding signals.

Optionally, the inserting Y second signal units into X first signal units obtained in each unit time includes:

when X is greater than or equal to Y, rounding down a ratio of X to Y to obtain E; determining, based on Y and a remainder that is obtained by dividing X by Y, whether a quantity of first signal units obtained each time in a unit time is E or E+1; and based on the determined quantity, obtaining a first signal unit for Y times in a current unit time, and inserting one second signal unit after the first signal unit obtained each time; and when X is less than Y, rounding down a ratio of Y to X to obtain F; determining, based on X and a remainder that is obtained by dividing Y by X, whether a quantity of second signal units inserted after one first signal unit obtained each time in a unit time is F or F+1; and obtaining a first signal unit for X times in a current unit time, and inserting, based on the determined quantity, a second signal unit after one signal unit obtained each time.

In this embodiment of the present invention, evenness insertion is performed in a differential manner. This further improves evenness of inserting the padding signals into the first service signals.

Optionally, before the inserting a padding signal into the first service signal A based on a transmission rate of the first service signal A and the reference rate, the method further includes:

determining the reference rate based on transmission rates or configured rates of the N first service signals.

Optionally, the determining the reference rate based on transmission rates of the N first service signals includes:

determining 1/T of a transmission rate of a target first service signal as the reference rate, where the target first service signal is one of the N first service signals, and T is a positive integer; or according to a policy that a total quantity of bits of the padding signals inserted into the N first service signals is the smallest, selecting one service signal from the N first service signals, and using 1/T of a transmission rate of the selected service signal as the reference rate, where T is a positive integer.

In other words, 1/T of a transmission rate of any one of the N first service signals may be used as the reference rate, or 1/T of the transmission rate of the service signal selected from the N first service signals according to the policy that the total quantity of bits of the padding signals inserted into the N first service signals is the smallest may be used as the reference rate.

In this embodiment of the present invention, a plurality of manners of selecting the reference rate are provided. This improves flexibility of setting the reference rate. In addition, the reference rate is determined according to the policy that the total quantity of bits of the padding signals inserted into the N first service signals is the smallest. This can reduce bits for inserting a padding signal and improve resource utilization of the padding signal, and can further reduce operation frequency of padding signal insertion and improve insertion efficiency.

Optionally, the selecting one service signal from the N first service signals according to a policy that a total quantity of bits of the padding signals inserted into the N first service signals is the smallest includes:

for a first service signal B in the N first service signals, when it is assumed that 1/T of a transmission rate of the first service signal B is used as the reference rate and it is ensured that the transmission rates of the N second service signals are integer multiples of the reference rate, determining a total quantity of bits of the padding signals that need to be inserted into the N first service signals within a preset time period, and using the determined total quantity of bits as a padding quantity of the first service signal B; and determining one first service signal with a smallest padding quantity in the padding quantity of the N first service signals, and using the first service signal with the smallest padding quantity as the selected service signal.

Optionally, the inserting a padding signal into the first service signal A based on a transmission rate of the first service signal A and the reference rate, to obtain a second service signal corresponding to the first service signal A includes:

determining, based on the transmission rate of the first service signal A and the reference rate, a transmission rate of the second service signal corresponding to the first service signal A; and inserting the padding signal into the first service signal A based on the transmission rate of the first service signal A and the transmission rate of the second service signal corresponding to the first service signal A, to obtain the second service signal corresponding to the first service signal A.

In this embodiment of the present invention, the transmission rate of the second service signal corresponding to the first service signal A is predetermined based on the transmission rate of the first service signal A and the reference rate, and then the padding signal is inserted into the first service signal A based on the transmission rate of the first service signal A and the transmission rate of the corresponding second service signal. In this way, an input signal transmission rate and an output signal transmission rate can be learnt clearly. In addition, insertion can accurately be performed on an input signal, namely, the first service signal A, based on the input signal transmission rate and the output signal transmission rate, thereby improving accuracy of inserting the padding signal.

Optionally, the determining, based on the transmission rate of the first service signal A and the reference rate, a transmission rate of the second service signal corresponding to the first service signal A includes:

determining, based on a first product, the transmission rate of the second service signal corresponding to the first service signal A, where the first product is a product of a relative multiple of the first service signal A and the reference rate, and the relative multiple of the first service signal A is obtained by rounding up a ratio of the transmission rate of the first service signal A to the reference rate.

Optionally, the determining, based on a first product, the transmission rate of the second service signal corresponding to the first service signal A includes:

determining the first product as the transmission rate of the second service signal corresponding to the first service signal A; or obtaining a first rate adjustment upper limit; and adjusting the first product based on the first rate adjustment upper limit, to obtain the transmission rate of the second service signal corresponding to the first service signal A, where the first rate adjustment upper limit is predetermined based on a minimum value of allowable rate floating lower limits of the N first service signals and an allowable rate floating upper limit of the third service signal.

In this embodiment of the present invention, the first product is determined as the transmission rate of the second service signal corresponding to the first service signal A. Therefore, a processing manner is simple and efficient, and feasibility is relatively high. In addition, the transmission rate of the second service signal is further finely adjusted based on a rate tolerance of the first service signal and a rate tolerance of the third service signal, and transmission rates of the first service signal and the third service signal are allowed to change within respective rate tolerances. This improves precision of determining the transmission rate of the second service signal, and further increases an application scope of the solutions in this application.

Optionally, the adjusting the first product based on the first rate adjustment upper limit, to obtain the transmission rate of the second service signal corresponding to the first service signal A includes:

determining a sum of the first product and a second product as the transmission rate of the second service signal corresponding to the first service signal A, where the second product is a product of the first rate adjustment upper limit and the first product.

Optionally, before the obtaining N first service signals, the method further includes:

receiving N fourth service signals, where there is a fourth service signal whose coding type is different from a target coding type in the N fourth service signals, and the target coding type is the coding type of the N first service signals;

performing, based on the target coding type, coding conversion on the fourth service signal whose coding type is different from the target coding type in the N fourth service signals; and determining a coding-converted fourth service signal and a fourth service signal whose coding type is the same as the target coding type as the N first service signals.

Optionally, the multiplexing the N second service signals into one third service signal includes:

successively extracting, based on a ratio between the transmission rates of the N second service signals, signal units from the N second service signals, and forming one third service signal by using the successively extracted signal units.

Optionally, the extracted signal unit is a bit block.

Optionally, the determining Y based on the transmission rate of the first service signal A and the reference rate includes:

determining Y based on a deviation rate between the transmission rate of the second service signal corresponding to the first service signal A and the transmission rate of the first service signal A, where the transmission rate of the second service signal corresponding to the first service signal A is determined based on the transmission rate of the first service signal A and the reference rate.

In this embodiment of the present invention, a deviation rate between the first service signal A and the corresponding second service signal can be accurately calculated. Then, the padding signal is inserted into the first service signal based on the deviation rate, to adapt the transmission rate of the first service signal, so as to obtain the second service signal that satisfies a rate requirement.

Optionally, the inserting the padding signal into the first service signal A based on the transmission rate of the first service signal A and the transmission rate of the second service signal corresponding to the first service signal A, to obtain the second service signal corresponding to the first service signal A includes:

determining X based on the transmission rate of the first service signal A, where X is a quantity of first signal units obtained in a unit time, and the first signal unit is a signal unit of the first service signal A;

determining Y based on the deviation rate between the transmission rate of the second service signal corresponding to the first service signal A and the transmission rate of the first service signal A, where Y is a quantity of second signal units that need to be inserted into a group of first signal units obtained in a unit time, and the second signal unit is a signal unit of the padding signal; and in a process of obtaining a group of first signal units in each unit time, inserting Y second signal units into X first signal units obtained in each unit time.

Optionally, the determining, based on the transmission rate of the first service signal A and the reference rate, a transmission rate of the second service signal corresponding to the first service signal A includes:

obtaining a second rate adjustment upper limit, where the second rate adjustment upper limit is predetermined based on a maximum value of a proportion of maintenance and management signals that need to be separately inserted into the N first service signals, or is predetermined based on a maximum value of a proportion of maintenance and management signals that need to be separately inserted into the N first service signals, a minimum value of allowable rate floating lower limits of the N first service signals and an allowable rate floating upper limit of the third service signal; and adjusting a first product based on the second rate adjustment upper limit, to obtain the transmission rate of the second service signal corresponding to the first service signal A, where the first product is a product of a relative multiple of the first service signal A and the reference rate, and the relative multiple of the first service signal A is obtained by rounding up a ratio of the transmission rate of the first service signal A to the reference rate.

The inserting the padding signal into the first service signal A based on the transmission rate of the first service signal A and the transmission rate of the second service signal corresponding to the first service signal A includes:

inserting a maintenance and management signal and a deviation adaptation signal that are used as padding signals into the first service signal A based on a proportion of the maintenance and management signal that needs to be inserted into the first service signal A, the transmission rate of the first service signal A, and the transmission rate of the second service signal corresponding to the first service signal A.

Optionally, the inserting a maintenance and management signal and a deviation adaptation signal that are used as padding signals into the first service signal A based on a proportion of the maintenance and management signal that needs to be inserted into the first service signal A, the transmission rate of the first service signal A, and the transmission rate of the second service signal corresponding to the first service signal A includes:

inserting the maintenance and management signal into the first service signal A based on the proportion of the maintenance and management signal that needs to be inserted into the first service signal A;

determining, based on the transmission rate of the first service signal A and the proportion of the maintenance and management signal that is inserted into the first service signal A, a transmission rate of the first service signal A in which the maintenance and management signal has been inserted; and inserting the deviation adaptation signal into the first service signal A in which the maintenance and management signal has been inserted, based on the transmission rate of the first service signal A in which the maintenance and management signal has been inserted and the transmission rate of the second service signal corresponding to the first service signal A.

In this embodiment of the present invention, the maintenance and management signal is inserted into the first service signal. This can facilitate service signal maintenance and management in a multiplex transmission process. In addition, the transmission rate of the second service signal is finely adjusted based on the proportion of the maintenance and management signal for insertion, and a rate change caused by inserting the maintenance and management signal is allowed. Further, the transmission rate of the second service signal is finely adjusted based on the rate tolerances of the first service signal and the third service signal, and the proportion of the maintenance and management signal, transmission rates of the first service signal and the third service signal are allowed to change within respective rate tolerances and the rate change caused by inserting the maintenance and management signal is allowed.

According to a second aspect, a service signal transmission method is provided, where the method is applied to a second network device and the method includes:

receiving a third service signal sent by a first network device, where the third service signal is formed by multiplexing N second service signals, the N second service signals are obtained by inserting padding signals into N first service signals that are in a one-to-one correspondence with the N second service signals, transmission rates of the N second service signals are integer multiples of a reference rate, coding types of the N first service signals are the same, at least two of the N first service signals have different transmission rates, and N is an integer greater than or equal to 2;

demultiplexing the third service signal into the N second service signals according to a multiplexing rule of the N second service signals; and deleting the padding signals from the N second service signals obtained through demultiplexing, to obtain the N first service signals.

Optionally, the deleting the padding signals from the N second service signals obtained through demultiplexing, to obtain the N first service signals includes:

for a second service signal C in the N second service signals obtained through demultiplexing, when the second service signal C is obtained by inserting a deviation adaptation signal and a maintenance and management signal that are used as padding signals into a first service signal corresponding to the second service signal C, and when the maintenance and management signal is proportionally inserted into the first service signal corresponding to the second service signal C, deleting the deviation adaptation signal from the second service signal C;

extracting, based on a proportion of the maintenance and management signal inserted into the first service signal corresponding to the second service signal C, the maintenance and management signal from the second service signal C from which the deviation adaptation signal has been deleted; and determining the second service signal C from which the deviation adaptation signal has been deleted and the maintenance and management signal has been extracted, as the first service signal corresponding to the second service signal C.

In this embodiment of the present invention, according to a multiplexing rule of the N first service signals, the third service signal is demultiplexed and the padding signals are deleted from the service signals obtained through demultiplexing. In this way, the N first service signals can successfully be restored from the third service signal used for multiplex transmission, and a multiplex reception problem is resolved, thereby improving service signal transmission efficiency, and reducing occupied transmission resources.

According to a third aspect, a service signal transmission apparatus is provided. The service signal transmission apparatus has a function of implementing behaviors of the service signal transmission method in the first aspect. The service signal transmission apparatus includes at least one module, where the at least one module is configured to implement the service signal transmission method provided in the first aspect.

According to a fourth aspect, a service signal transmission apparatus is provided. The service signal transmission apparatus has a function of implementing behaviors of the service signal transmission method in the first aspect. The service signal transmission apparatus includes at least one module, where the at least one module is configured to implement the service signal transmission method provided in the second aspect.

According to a fifth aspect, a service signal transmission apparatus is provided. A structure of the service signal transmission apparatus includes a processor and a memory, and the memory is configured to: store a program used to support the service signal transmission apparatus in performing the service signal transmission method provided in the first aspect, and store data used to implement the service signal transmission method provided in the first aspect. The processor is configured to execute the program stored in the memory. An operation apparatus of the storage device may further include a communications bus, where the communications bus is configured to establish a connection between the processor and the memory.

According to a sixth aspect, a service signal transmission apparatus is provided. A structure of the service signal transmission apparatus includes a processor and a memory, and the memory is configured to: store a program used to support the service signal transmission apparatus in performing the service signal transmission method provided in the second aspect, and store data used to implement the service signal transmission method provided in the second aspect. The processor is configured to execute the program stored in the memory. An operation apparatus of the storage device may further include a communications bus, where the communications bus is configured to establish a connection between the processor and the memory.

According to a seventh aspect, a computer readable storage medium is provided. The computer readable storage medium stores an instruction; and when the instruction is run on a computer, the computer is enabled to perform the service signal transmission method in the first aspect.

According to an eighth aspect, a computer program product including an instruction is provided. When the computer program product is run on a computer, the computer is enabled to perform the service signal transmission method in the first aspect.

Technical effects achieved in the third aspect, the fifth aspect, and the seventh aspect are similar to those achieved in the corresponding technical means of the first aspect, and the technical effects achieved in the fourth aspect, the sixth aspect, and the eighth aspect are similar to those achieved in the corresponding technical means of the second aspect. Details are not described herein again.

The technical solutions provided in this application have the following beneficial effects.

In this application, for the N (at least two) first service signals that have a same coding type and have different transmission rates, the padding signals may be inserted into the N first service signals, to obtain the N second service signals that are in a one-to-one correspondence with the N first service signals. Then, the N second service signals are multiplexed into one third service signal, and the third service signal is sent to the second network device. The transmission rates of the N second service signals are integer multiples of the reference rate. In other words, the transmission rates of the N second service signals have the obvious integer-ratio characteristic. The padding signals are inserted into the N first service signals, to obtain the N second service signals whose corresponding transmission rates have the obvious integer-ratio characteristic. This facilitates subsequent multiplex transmission of the N second service signals that have the obvious integer-ratio characteristic, and resolves a problem of multiplexing service signals with different transmission rates. The N second service signals obtained by performing padding on the N first service signals are multiplexed into one third service signal. This implements multiplex transmission of the N first service signals. In comparison with a separate transmission manner in a related technology, in this application, service signal transmission efficiency is improved, and occupied transmission resources are reduced.

BRIEF DESCRIPTION OF DRAWINGS

To describe technical solutions in embodiments of this application more clearly, the following briefly describes accompanying drawings required for describing the embodiments. Apparently, the accompanying drawings in the following description show merely some embodiments of this application, and a person of ordinary skill in the art may still derive other drawings from these accompanying drawings without creative efforts.

FIG. 12 is a schematic structural diagram of a code block structure of an IDLE code block according to this application;

DESCRIPTION OF EMBODIMENTS

To make objectives, technical solutions, and advantages of this application clearer, the following further details implementations of this application with reference to the accompanying drawings.

Before this application is detailed, terms in this application are first described.

Ethernet (Ethernet)

The Ethernet is baseband local area network specification, and is the most common communication protocol standard used for an existing local area network.

Flexible Ethernet (Flexible Ethernet, FlexE)

The FlexE is an interface technology that implements service isolation carrying and network slicing, and FlexE develops rapidly in recent two years and is widely accepted by various main standard organizations.

Ubiquitous Ethernet (X-Ethernet, X-E)

The X-E is a switching technology system based on a bit block (Bit Block) at an Ethernet physical layer, and has a deterministic ultra-low latency characteristic. A coding type used by the X-E may be a 64B/66B coding type or the like.

M/N Bit Block Coding

The M/N bit block coding represents a coding type with M payload bits and N bits, where the N bits include the M payload bits and several synchronization bits. In other words, in the M/N bit block, M is less than or equal to N. An M/N bit block stream is transmitted over an Ethernet physical layer link. For example, if 8B/10B coding is used for a 1 G Ethernet, an 8B/10B code block stream is transmitted over a 1GE physical layer link. If 64B/66B coding is used for a 10GE/40GE/100GE Ethernet, a 64B/66B code block stream is transmitted over a 10GE/40GE/100GE Ethernet physical layer link. With development of the Ethernet technology, other coding types will emerge in the future. For example, there may be possible coding schemes such as 128B/130B and 256B/257B coding.

Figure 1:
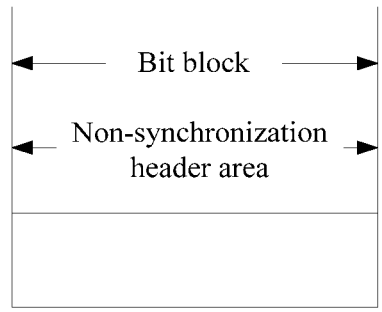
FIG. 1 is a schematic diagram of an M/N bit block according to this application.
Figure 2:
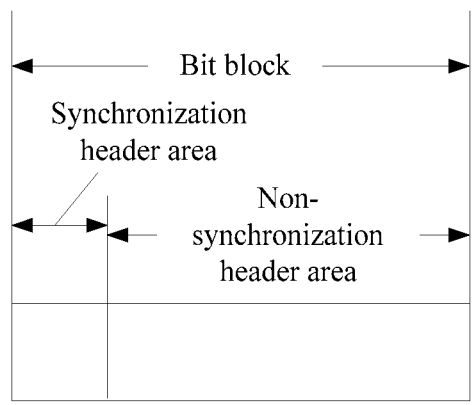
FIG. 2 is a schematic diagram of another M/N bit block according to this application.
Figure 3:
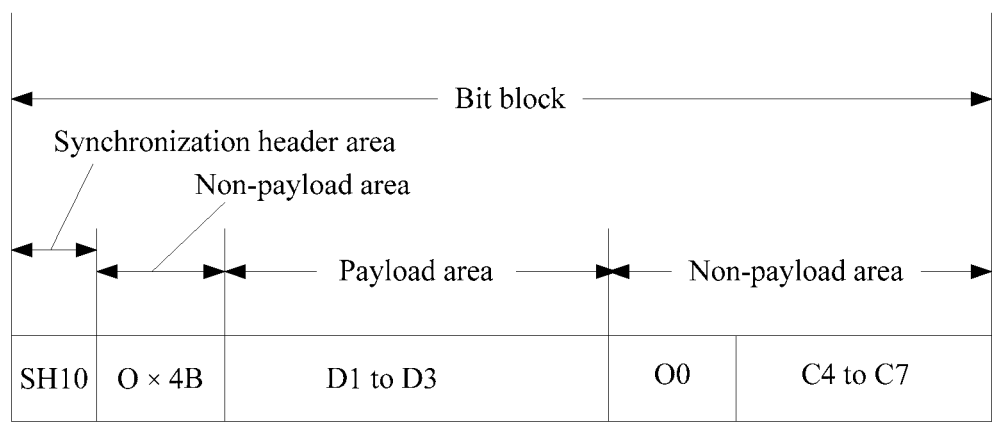
FIG. 3 is a schematic diagram of still another M/N bit block according to this application.

For example, FIG. 1 to FIG. 3 are schematic diagrams of three types of M/N bit blocks according to this application. FIG. 1 shows a case in which M is equal to N. In other words, an entire code block carries only payloads. FIG. 2 and FIG. 3 show cases in which M is less than or equal to N. A code block shown in FIG. 2 includes a payload area of M bits and a synchronization area of (N-M) bits. Locations of (N-M) synchronization bits in a code block shown in FIG. 3 are flexibly distributed in the code block.

Non-M/N Bit Block Coding

The non-M/N bit block coding represents another coding method such as service frame (Frame) coding, rather than M/N bit block coding, is used in a coding technology, for example, a synchronous digital hierarchy (Synchronous Digital Hierarchy, SDH) or an optical transport network (Optical Transport Network, OTN).

Network Device Connected to User Equipment at a Network Edge (Provider Edge, PE)

The PE main network edge side in this specification is configured to transmit, to a local network, a service signal outside the network, or restore a service signal from a local network and transmit the service signal to the outside of the network.

Nominal Rate (Nominal Rate)

The nominal rate is a theoretical signal transmit/receive rate of a signal transmitter/receiver under an ideal working condition. The ideal working condition includes that a signal clock is run at a center frequency without an offset.

Average Rate (Average Rate)

The average rate is an average signal transmit/receive rate of a signal transmitter/receiver in a unit time. Generally, an actual signal transmit/receive rate is an average transmit/receive rate of a signal in a unit time. Common unit times are second, minute, hour, or any time interval.

Frequency Tolerance

During actual transmission, a central frequency of a reference clock of a signal fluctuates within a specific range. The fluctuation range is generally referred to as a frequency tolerance. Specifically, the frequency tolerance is (allowed frequency floating upper limit, allowed frequency floating lower limit).

Rate Tolerance

During actual transmission, a transmission rate of a signal is directly related to a frequency of a reference clock. An actual clock frequency varies within a frequency tolerance around a center frequency, and a corresponding actual signal rate varies within a specific range around a nominal rate. The variation range is referred to as a rate tolerance in this specification. Specifically, the rate tolerance is (allowed rate floating upper limit, allowed rate floating lower limit). When no other complex factors are considered, a value of a rate tolerance of a signal is equal to that of a frequency tolerance of the reference clock.

Before this application is detailed, a system architecture in this application is first detailed.

Figure 4:
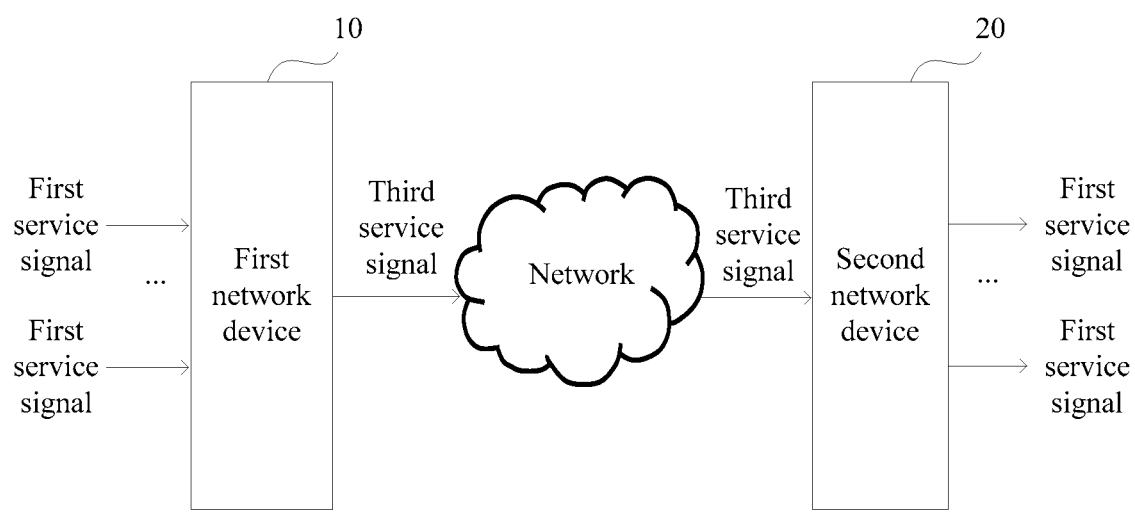
FIG. 4 is a schematic diagram of a service signal transmission system according to this application.

FIG. 4 is a schematic diagram of a service signal transmission system according to this application. As shown in FIG. 4, the system includes a first network device 10 and a second network device 20, and the first network device 10 and the second network device 20 may be connected by using a network. The first network device 10 and the second network device 20 may be network devices (Provider, P) in the network, or may be PEs in the network. In addition, before the first network device 10 and the second network device 20, M third network devices (M≥0) may further be included, and the third network device is a P.

In a specific service scenario, a service signal usually needs to be transmitted between the first network device 10 and the second network device 20. However, in a related technology, for a plurality of service signals that have a same coding type, the first network device 10 needs to separately send the plurality of service signals to the second network device 20. Because the plurality of service signals need to be separately transmitted, transmission efficiency is relatively low, and transmission resources are wasted. To improve relatively low service signal transmission efficiency and reduce occupied transmission resources, a method for multiplex transmission of a plurality of service signals is provided in this application.

Specifically, the first network device 10 is configured to: obtain N first service signals; insert padding signals into the N first service signals, to obtain N second service signals that are in a one-to-one correspondence with the N first service signals; and multiplex the N second service signals into one third service signal, and send the third service signal to the second network device 20. Coding types of the N first service signals are the same, and at least two of the N first service signals have different transmission rates, where N is an integer greater than or equal to 2, and transmission rates of the N second service signals are integer multiples of a reference rate. The reference rate may be determined based on transmission rates of the N first service signals, or may be preconfigured. This is not limited in this application.

The second network device 20 is configured to: receive the third service signal sent by the first network device 10; demultiplex the third service signal into N second service signals according to a multiplexing rule of the N second service signals; and delete the padding signals from the N second service signals obtained through demultiplexing, to obtain the N first service signals.

Further, the first network device 10 may further include a control unit and a multiplexing unit, and the control unit and the multiplexing unit may be configured to implement multiplex transmission of the N first service signals. The following details the first network device 10 by using an example in which the first network device 10 includes the control unit and the multiplexing unit.

Figure 5:
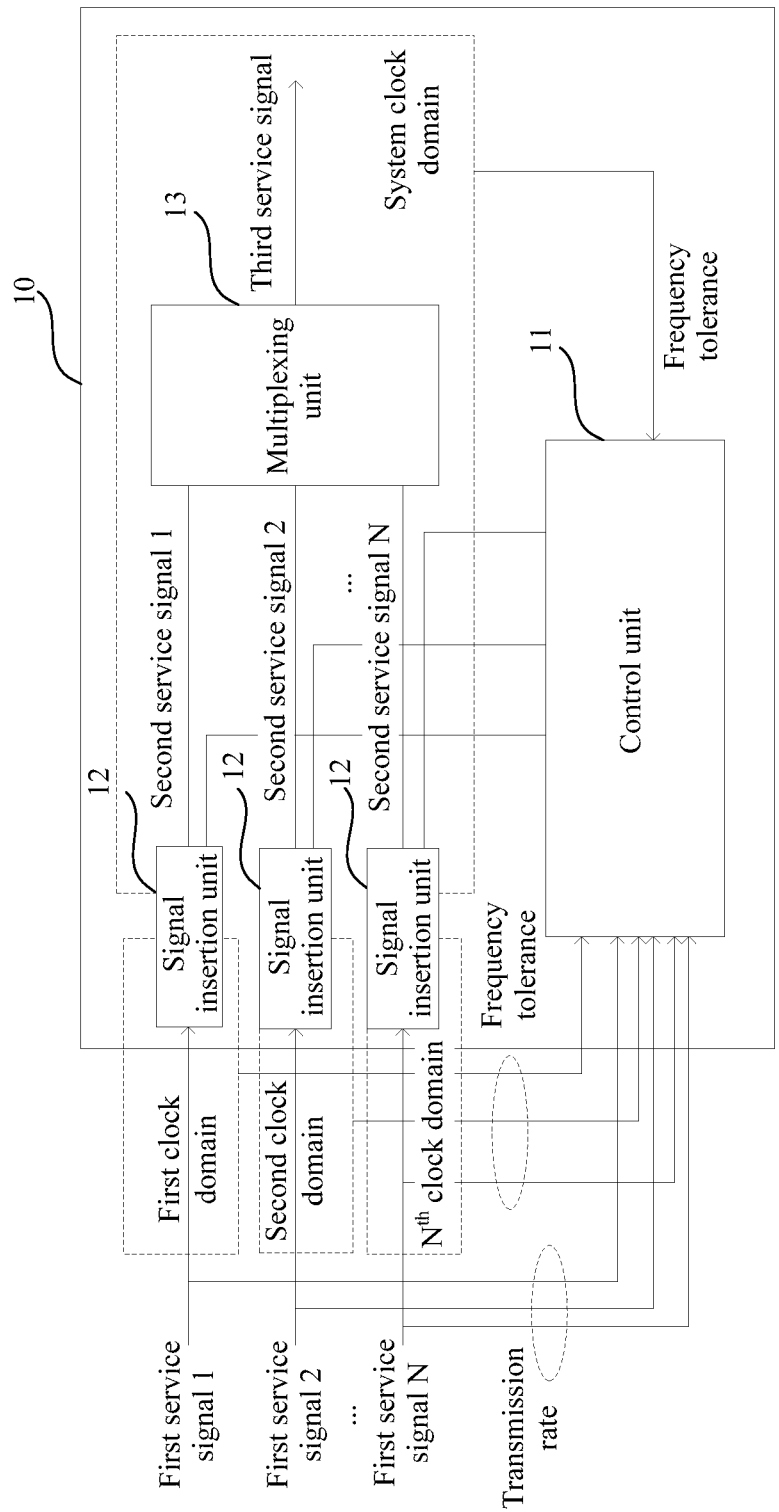
FIG. 5 is a schematic structural diagram of a first network device 10 according to this application.

FIG. 5 is a schematic structural diagram of a first network device 10 according to this application. As shown in FIG. 5, the first network device 10 includes a control unit 11, N signal insertion units 12, and a multiplexing unit 13.

The control unit 11 is configured to: after the first network device 10 obtains N first service signals, control the N signal insertion units 12 that are in a one-to-one correspondence with the N first service signals to insert padding signals into the N first service signals, to obtain N second service signals that are in a one-to-one correspondence with the N first service signals. The multiplexing unit 12 is configured to multiplex the N second service signals into one third service signal, so that the first network device 10 sends the multiplexed third service signal to a second network device 20.

Specifically, the control unit 11 may be configured to determine transmission rates of the N first service signals; determine a reference rate based on the transmission rates or configured rates of the N first service signals; for each of the N first service signals, determine, based on a transmission rate of the first service signal and the reference rate, a transmission rate of a second service signal corresponding to the first service signal; and control a signal insertion unit 12 corresponding to the first service signal to insert a padding signal into the first service signal based on the transmission rate of the first service signal and the transmission rate of the second service signal corresponding to the first service signal, to obtain the second service signal corresponding to the first service signal.

For example, referring to FIG. 5, for a first service signal 1 in the N first service signals, the control unit 11 may determine, based on a transmission rate of the first service signal 1 and the reference rate, a transmission rate of a second service signal 1 corresponding to the first service signal 1; and control a signal insertion unit 12 corresponding to the first service signal 1 to insert a padding signal into the first service signal 1 based on the transmission rate of the first service signal 1 and the transmission rate of the second service signal 1 corresponding to the first service signal, to obtain a second service signal 1 corresponding to the first service signal 1.

In a possible embodiment, the signal insertion unit 12 corresponding to the first service signal may determine X based on the transmission rate of the first service signal; determine Y based on the transmission rate of the first service signal and the reference rate; and in a process of obtaining a group of first signal units in each unit time, insert Y second signal units into X first signal units obtained in each unit time. X is a quantity of first signal units obtained in a unit time, and the first signal unit is a signal unit of the first service signal. Y is a quantity of second signal units that need to be inserted into a group of first signal units obtained in a unit time, and the second signal unit is a signal unit of the padding signal.

Specifically, the signal insertion unit 12 may determine Y based on the transmission rate of the first service signal and the transmission rate of the corresponding second service signal, for example, determine Y based on a deviation rate between the transmission rate of the second service signal corresponding to the first service signal and the transmission rate of the first service signal.

Further, the control unit 11 may further obtain a rate tolerance of each of the N first service signals and a rate tolerance of the third service signal; determine, based on rate tolerances of the N first service signals and the rate tolerance of the third service signal, a first rate adjustment upper limit; and for each of the N first service signals, determine, based on the transmission rate of the first service signal, the reference rate, and the first rate adjustment upper limit, the transmission rate of the second service signal corresponding to the first service signal.

For example, as shown in FIG. 5, the N first service signals are respectively run in respective clock domains. For example, a first service signal 1 is run in a first clock domain, a first service signal 2 is run in s second clock domain, and a first service signal N is run in an $N^{th}$ clock domain. The third service signal is run in a system clock domain. In an implementation, the control unit 11 may separately determine a frequency tolerance of a clock domain of each first service signal, and determine a rate tolerance of each first service signal based on the frequency tolerance of the clock domain of the first service signal. In addition, the control unit 11 may further determine a frequency tolerance of the system clock domain of the third service signal, and determine the rate tolerance of the third service signal based on the frequency tolerance of the system clock domain of the third service signal.

It should be noted that in FIG. 5, an example is merely used for description in which the control unit 11 determines frequency tolerances of the N first service signals based on the clock domains of the N first service signals, and determines the frequency tolerance of the third service signals based on the system clock domain of the third service signal. However, in actual application, the frequency tolerances of the N first service signals and the frequency tolerance of the third service signal may alternatively be configured by a user, stored in a specific register, or obtained in another manner. For example, the frequency tolerances of the N first service signals may alternatively be carried in the corresponding first service signals. This is not limited in this application. Therefore, the control unit 11 may determine the rate tolerance of the signal based on the frequency tolerance of the signal. When no other complex factors are considered, a value of the rate tolerance of the signal is equal to that of the frequency tolerance of the signal. Whether another factor is considered is a specific implementation of the control unit. Details are not described in this application.

Further, the control unit 11 may further determine a proportion of maintenance and management signals that need to be separately inserted into the N first service signals; and determine a second rate adjustment upper limit based on the proportion of the maintenance and management signals that need to be separately inserted into the N first service signals. Alternatively, the control unit 11 may further determine the rate tolerance of each of the N first service signals and the rate tolerance of the third service signal, and determine a proportion of maintenance and management signals that need to be separately inserted into the N first service signals; and determine a second rate adjustment upper limit based on the rate tolerance of each of the N first service signals, the rate tolerance of the third service signal, and the proportion of the maintenance and management signals that need to be separately inserted into the N first service signals. Then, for each of the N first service signals, the control unit 11 may determine, based on the transmission rate of the first service signal, the reference rate, and the second rate adjustment upper limit, the transmission rate of the second service signal corresponding to the first service signal.

In other words, the transmission rates of the N second service signals may further be finely adjusted based on the rate tolerances of the N first service signals, the rate tolerance of the third service signal, and the proportion of the maintenance and management signals that need to be separately inserted into the N first service signals. In this way, specific to the determined transmission rates of the N second service signals, the rate tolerances of the first service signals and the third service signal and insertion of a specific proportion of the maintenance and management signals into the N first service signals are further allowable.

Further, the control unit 11 may further include a rate adjustment unit (Rate Adjust Process, RAP) and a tolerance adjustment unit (Tolerance Adjust Process, TAP). The RAP is configured to determine, based on the transmission rates of the N first service signals and the reference rate, the transmission rates of the second service signals corresponding to the N first service signals. The TAP is configured to: on a basis of the transmission rates of the second service signals that are determined by the RAP, further finely adjust the transmission rates of the second service signals based on at least one of the rate tolerances of the N first service signals, the rate tolerance of the third service signal, or the proportion of the maintenance and management signals that need to be separately inserted into the N first service signals.

Further, the N signal insertion units 12 may be N service layer channels (Service Pat, SP). To be specific, the obtained N first service signals may respectively be sent to the N SPs that are in a one-to-one correspondence with the N first service signals, and padding signals are inserted on the N SPs.

It should be noted that a control procedure for the control unit 11 may be independent of a main service procedure for the first network device 10, and the control procedure can flexibly be started and stopped depending on a requirement.

In addition, the second network device 20 may further include a demultiplexing unit, and the demultiplexing unit may be configured to demultiplex the third service signal into 20 for detailed description.

Figure 6:
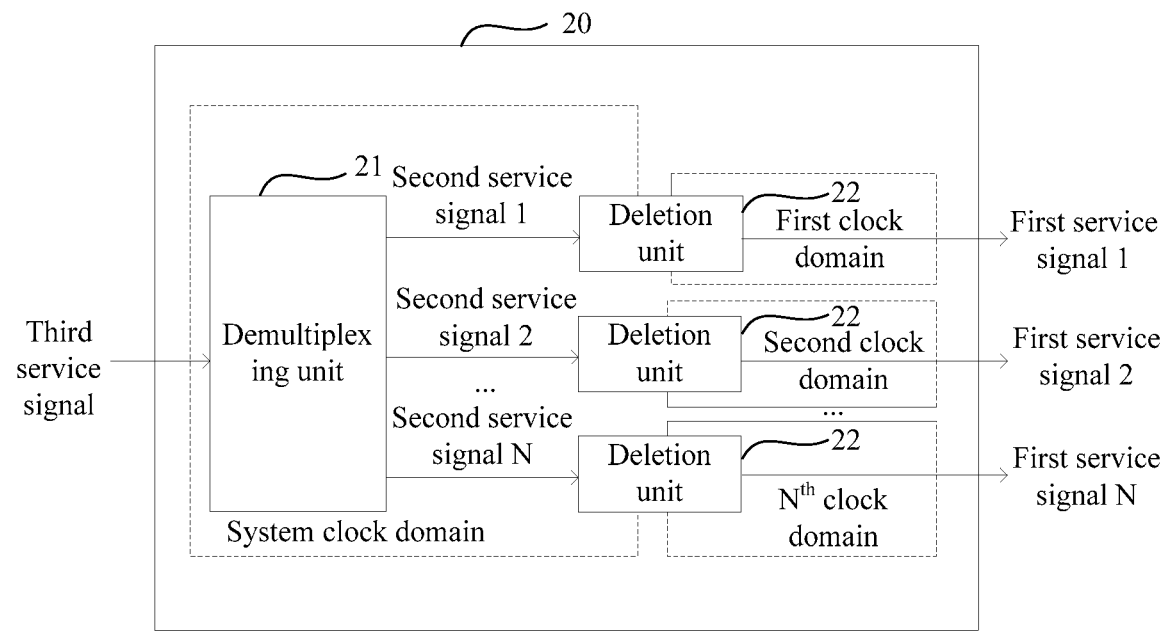
FIG. 6 is a schematic structural diagram of a second network device 20 according to this application.

FIG. 6 is a schematic structural diagram of a second network device 20 according to this application. As shown in FIG. 6, the second network device 20 includes a demultiplexing unit 21 and N deletion units 22.

Specifically, the demultiplexing unit 21 is configured to: after the second network device 20 receives a third service signal sent by a first network device 10, demultiplex the third service signal into N second service signals according to a multiplexing rule of the N second service signals. The N deletion units 22 are in a one-to-one correspondence with the N second service signals, and are configured to delete padding signals separately from the corresponding second service signals, to obtain N first service signals.

It should be noted that the service transmission method provided in this application can be applied to a scenario in which a service signal is transmitted based on a bit block, for example, applied to a scenario in which a service signal is transmitted based on a technology such as an Ethernet, a flexible Ethernet (Flexible Ethernet, FlexE), or an X-E. For example, coding types of the N first service signals and the corresponding N second service signals in this application may be M/N bit block coding. A coding type of the third service signal in this application may be M/N bit block coding or non-M/N bit block coding, and the coding type of the third service signal is not limited in this application.

For example, that the service transmission method provided in this application is applied to a scenario in which a service signal is transmitted based on an X-E technology is used as an example. The first network device and the second network device may be PEs or Ps in X-E networking.

Figure 7:
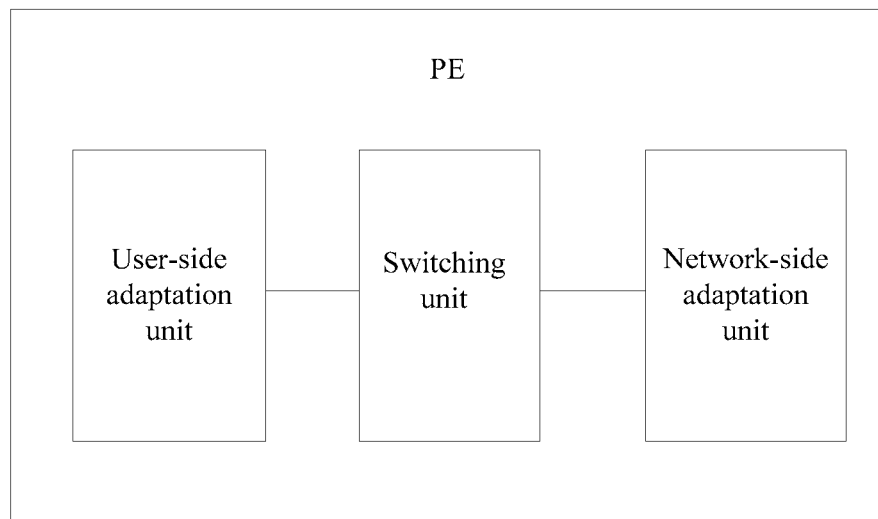
FIG. 7 is a schematic structural diagram of a PE in X-E networking according to this application.

FIG. 7 is a schematic structural diagram of a PE in X-E networking according to this application. As shown in FIG. 7, the PE in the X-E networking may include a user-side adaptation unit (uAdpt), a switching unit (Switch), and a network-side adaptation unit (nAdpt). The uAdpt includes a uAdpt deployed at a network ingress that is abbreviated as a uAdpt(i), and a uAdpt deployed at a network egress that is abbreviated as a uAdpt(e). The uAdpt(i) is configured to implement adaptation and interleaving of low-speed service signals or low-speed channels, to add service signals to a FlexE high-speed channel. The uAdpt(e) is configured to implement functions such as de-interleaving and adapting of the FlexE high-speed channel, to restore the low-speed service signals or the low-speed channels from the FlexE high-speed channel. The nAdpt is mainly configured to multiplex FlexE channels into a FlexE SHIM and transmit the FlexE SHIM through a FlexE interface, or restore FlexE channels from a FlexE SHIM of a FlexE interface. In this application, the uAdpt or the nAdpt in the PE may be configured to implement multiplex transmission of received N service signals, or restore original N service signals from one service signal obtained through multiplexing. In actual application, a control unit may be deployed in the uAdpt or the nAdpt to implement the method in this application. The control unit may be software, a programmable device, an integrated circuit, or the like. For example, the integrated circuit may be an application-specific integrated circuit (Application Specific Integrated Circuit, ASIC).

Figure 8:
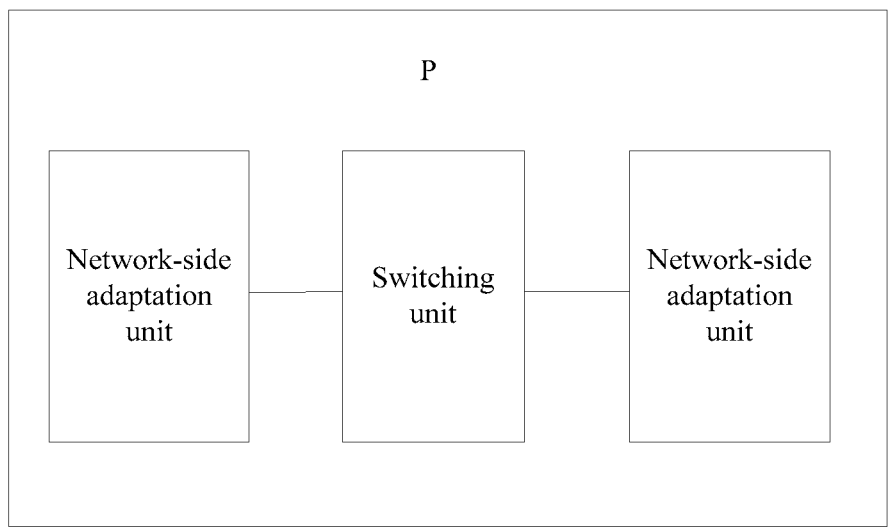
FIG. 8 is a schematic structural diagram of a P in X-E networking according to this application.

FIG. 8 is a schematic structural diagram of a P in X-E networking according to this application. As shown in FIG. 8, the P in the X-E networking may include nAdpts on two sides and a switch between the nAdpts. In this application, the nAdpts in the P may be configured to implement multiplex transmission of received N service signals, or restore original N service signals from one service signal obtained through multiplexing. In actual application, a control unit may be deployed in the nAdpts to implement the method in this application. The control unit may be software, a programmable device, an integrated circuit, or the like. For example, the integrated circuit may be an ASIC.

Figure 9:
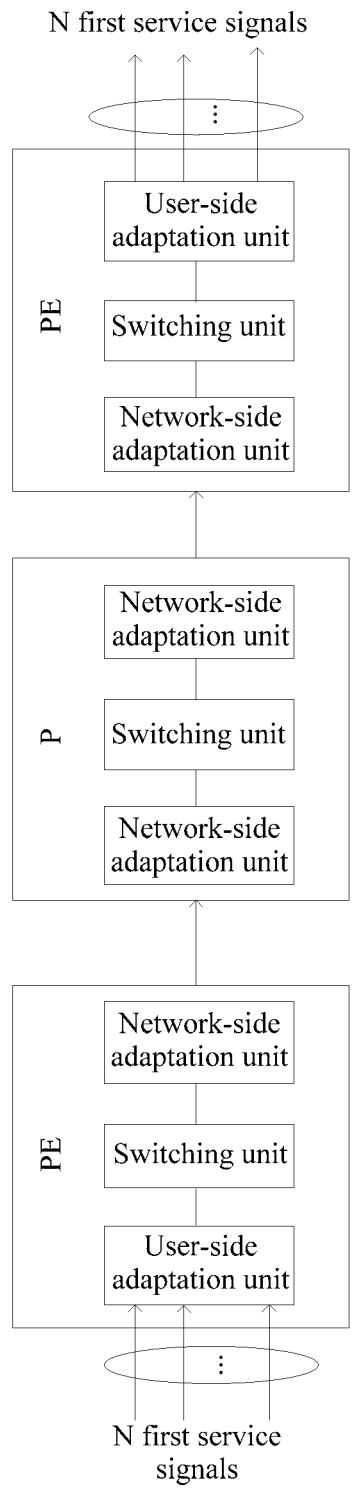
FIG. 9 is a schematic diagram of establishing a network and transmitting a service signal by using an X-E technology according to this application.

FIG. 9 is a schematic diagram of establishing a network and transmitting a service signal by using an X-E technology according to this application. As shown in FIG. 9, the network established by using the X-E technology includes a PE 30, a P 40, and a PE 50. The PE 30 may multiplex received N service signals of a user into one service signal, and send the service signal to the PE 50 through the P 40. After receiving the service signal, the PE 50 may restore the N service signals of the user from the service signal.

Figure 10:
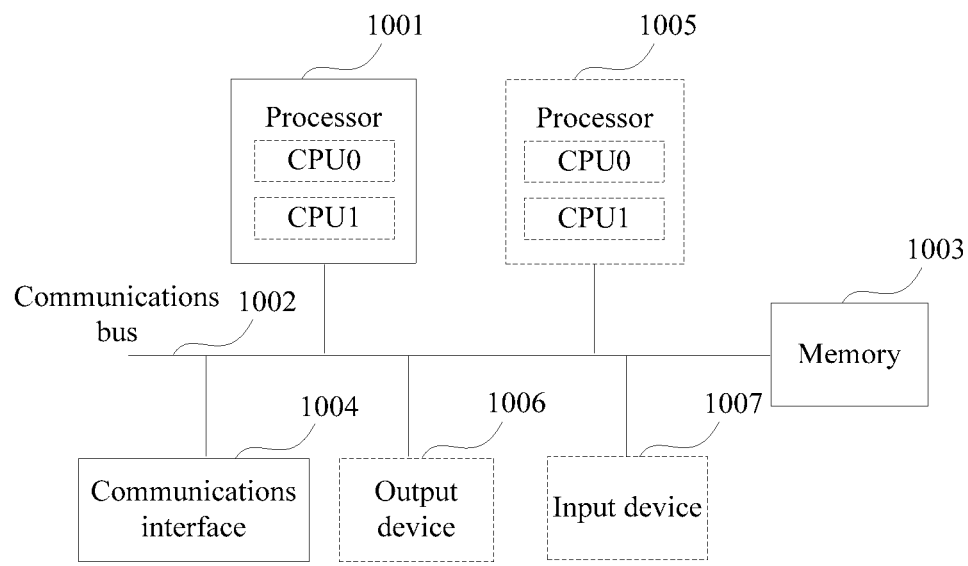
FIG. 10 is a schematic structural diagram of a network device according to this application.

FIG. 10 is a schematic structural diagram of a network device according to this application. The network device may be the first network device 10 or the second network device 20. In actual application, the network device may be an IPRAN device, a PTN device, or the like. Referring to FIG. 10, the network device includes at least one processor 1001, a communications bus 1002, a memory 1003, and at least one communications interface 1004.

The processor 1001 may be a general-purpose central processing unit (Central Processing Unit, CPU), a microprocessor, an application-specific integrated circuit (application-specific integrated circuit, ASIC), or one or more integrated circuits configured to control program execution of the solutions in this application.

The communications bus 1002 may include a channel used to transfer information between the foregoing components.

The memory 1003 may be a read-only memory (read-only memory, ROM), another type of static storage device that can store static information and an instruction, a random access memory (random access memory, RAM), or another type of dynamic storage device that can store information and an instruction, or may be an electrically erasable programmable read-only memory (Electrically Erasable Programmable Read-Only Memory, EEPROM), a compact disc read-only memory (Compact Disc Read-Only Memory, CD-ROM), other optical disk storage, optical disc storage (including a compact disc, a laser disc, an optical disc, a digital versatile disc, a Blu-ray disc, and the like), a magnetic disk storage medium, another magnetic storage device, or any other medium that can be used to carry or store expected program code in a form of an instruction or a data structure and that is accessible by a computer. However, this is not limited thereto. The memory 1003 may exist alone, and is connected to the processor 1001 through the communications bus 1002. Alternatively, the memory 1003 may be integrated with the processor 1001.

The communications interface 1004 uses any apparatus such as a transceiver to communicate with another device or a communications network, such as an Ethernet, a radio access network (RAN), or a wireless local area network (Wireless Local Area Networks, WLAN).

During specific implementation, in an embodiment, the processor 1001 may include one or more CPUs, for example, a CPU 0 and a CPU 1 in FIG. 10.

During specific implementation, in an embodiment, the network device may include a plurality of processors, for example, the processor 1001 and a processor 1005 that are shown in FIG. 10. Each of the processors may be a single-core processor (single-CPU) or a multi-core processor (multi-CPU). The processor herein may be at least one device, circuit, and/or processing core for processing data (for example, a computer program instruction).

During specific implementation, in an embodiment, the network device may further include an output device 1006 and an input device 1007. The output device 1006 communicates with the processor 1001, and may display information in a plurality of manners. For example, the output device 1006 may be a liquid crystal display (liquid crystal display, LCD), a light emitting diode (light emitting diode, LED) display device, a cathode ray tube (cathode ray tube, CRT) display device, or a projector (projector). The input device 1007 communicates with the processor 1001, and may receive user input in a plurality of manners. For example, the input device 1007 may be a mouse, a keyboard, a touchscreen device, or a sensing device.

During specific implementation, the network device may be a desktop computer, a portable computer, a network server, a personal digital assistant (Personal Digital Assistant, PDA), a mobile phone, a tablet computer, a wireless terminal device, a communications device, or an embedded device. A type of the network device is not limited in this application.

The memory 1003 is configured to store program code for performing the solution in this application, and the processor 1001 controls execution. The processor 1001 is configured to execute program code 1008 stored in the memory 1003. The program code 1008 may include one or more software modules.

Figure 11:
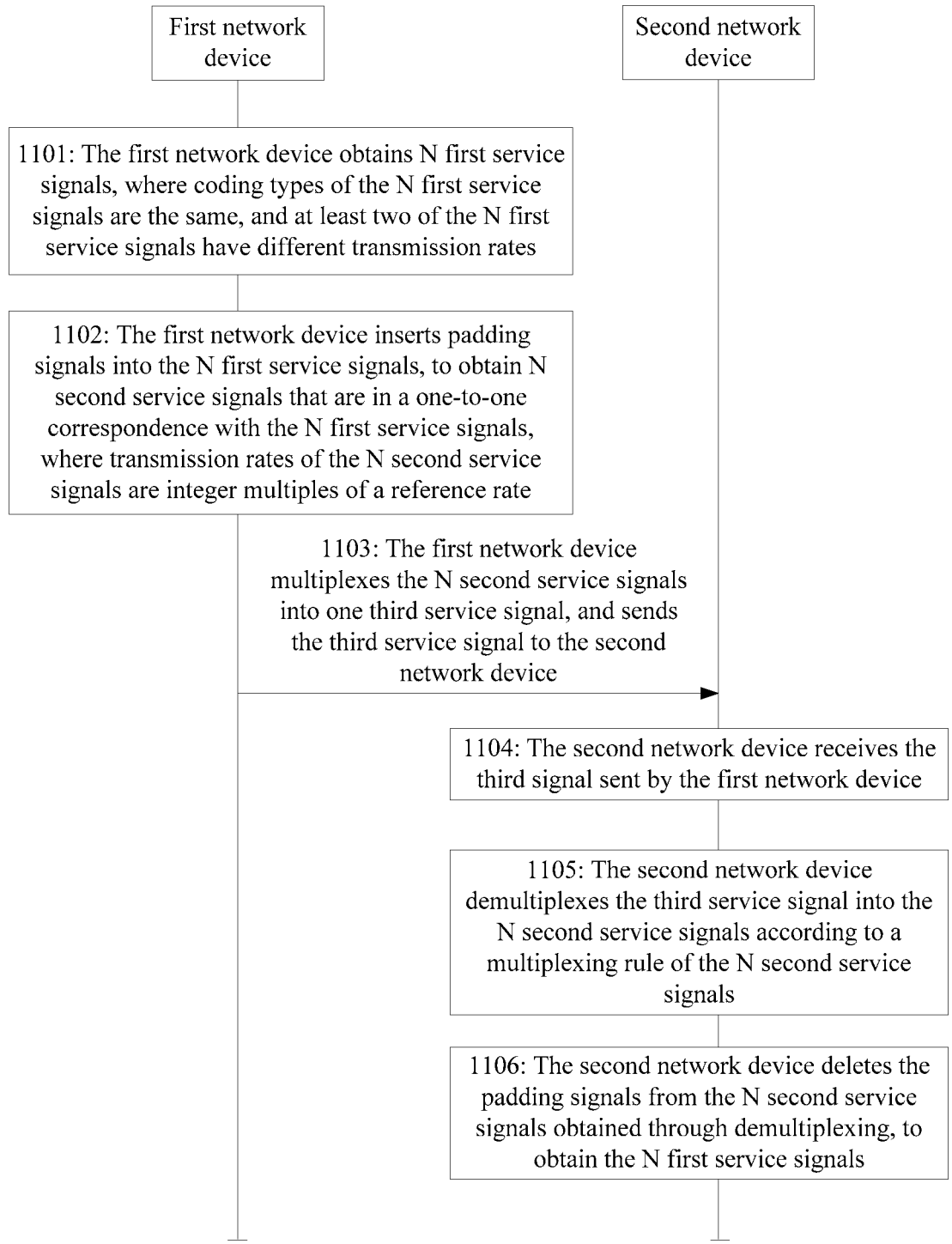
FIG. 11 is a flowchart of a service transmission method according to this application.

FIG. 11 is a flowchart of a service transmission method according to this application.

The method can be applied to the service transmission system shown in FIG. 1. As shown in FIG. 11, the method includes the following steps.

Step 1101: A first network device obtains N first service signals, where coding types of the N first service signals are the same, and at least two of the N first service signals have different transmission rates.

N is an integer greater than or equal to 2. For example, N may be 2, 3, or 5. The first network device may be a PE, a P, or the like. The N first service signals may be service signals received by the first network device from another device, or may be service signals obtained by performing coding conversion on service signals received from another device.

That at least two of the N first service signals have different transmission rates means that at least two of the N first service signals have different nominal rates or average rates. In other words, a transmission rate of the first service signal in this application may be a nominal rate of the first service signal, or may be an average rate of the first service signal. This is not limited in this application.

Specifically, before obtaining the N first service signals, the first network device may further receive N fourth service signals; when there is a fourth service signal whose coding type is different from a target coding type in the N fourth service signals, perform, based on the target coding type, coding conversion on the fourth service signal whose coding type is different from the target coding type in the N fourth service signals; and determine a coding-converted fourth service signal and a fourth service signal whose coding type is the same as the target coding type as the N first service signals. Alternatively, when there is no fourth service signal whose coding type is different from the target coding type in the N fourth service signals, that is, when coding types of all the N fourth service signals are the target coding type, the first network device may directly use the N fourth service signals as the N first service signals.

The target coding type is the coding type of the N first service signals, that is, a coding type used to support the first network device in transmission. In actual application, the target coding type may be M/N bit block coding such as 64B/66B coding or 8B/10B coding. The received N fourth service signals are converted into service signals of the target coding type, so that the first network device processes the coding-converted service signals.

For example, when the first network device is a PE, the PE may receive N fourth service signals sent by a user terminal; and when there is a fourth service signal whose coding type is different from the target coding type in the N fourth service signals, perform coding conversion on the N fourth service signals based on the target coding type, to obtain the N first service signals, or when there is no fourth service signal whose coding type is different from the target coding type in the N fourth service signals, use the N fourth service signals as the N first service signals.

In addition, it should be noted that a transmission rate of the coding-converted service signal also changes. To be specific, a transmission rate of the fourth service signal before the coding conversion is different from that of the coding-converted first service signal. For example, for a fourth service signal whose coding type is different from the target coding type in the N fourth service signals. After coding conversion is performed on the fourth service signal based on the target coding type to obtain a corresponding first service signal, a transmission rate of the coding-converted first service signal also needs to be determined based on a transmission rate of the fourth service signal and a coding conversion relationship between the coding type of the fourth service signal and the target coding type. The transmission rate of the fourth service signal in this application may be a nominal rate of the fourth service signal, or may be an average rate of the fourth service signal. This is not limited in this application.

For example, in a first embodiment, it is assumed that the first network device receives 11 fourth service signals sent by the user terminal. The 11 fourth service signals are Client1 to Client11. The Client1 to the Client10 are service signals whose transmission rates are 15552000 bps and coding types are SDHs, the Client11 is a service signal whose transmission rate is 266057 Kbps and coding type is an OTU1, and a target coding type is 64B/66B coding. Therefore, coding conversion needs to be performed on the Client1 to the Client11 based on the target coding type. To be specific, the Client1 to the Client11 are converted into service signals whose coding types are 64B/66B coding, to obtain Client1' to Client11'. After actual coding conversion is performed, signal bits of the Client1 to the Client11 may be loaded into a 64-bit payload area in a 64B/66B-bit block.

After the coding conversion is performed, transmission rates of the Client1' to the Client10' are $$155520000 \times \frac{66}{64} = 160380000 \ bps,$$

and a transmission rate of the Client11' is $$2666057142.9 \times \frac{66}{64} = 2749371428.6 \ bps.$$

For ease of description, the transmission rates of the Client1' to the Client11' are respectively represented by c1 to c11 in the following.

For another example, in a second embodiment, it is assumed that the first network device receives three fourth service signals sent by the user terminal. The three fourth service signals are Client1 to Client3. The Client1 is a service signal whose transmission rate is 1.25 Gbps and coding type is 8B/10B coding, the Client2 is a service signal whose transmission rate is 8110.4 Mbps and coding type is 64B/66B coding, the Client3 is a service signal whose transmission rate is 10.3125 Gbps and coding type is 64B/66B coding, and a target coding type is 64B/66B coding. Therefore, coding conversion needs to be performed on the Client1 based on the target coding type. To be specific, the Client1 is converted into a service signal whose coding type is 64B/66B coding, to obtain Client1; and the Client2 and the Client3 are determined as Client2' and Client3'.

After the coding conversion is performed, a transmission rate of the Client1' is $$1250000000 \times \frac{8}{10} \times \frac{66}{64} = 1031250000 \ bps,$$

a transmission rate of the Client2' is 8110400000 bps, and a transmission rate of the Client3' is 10312500000 bps. For ease of description, the transmission rates of the Client1' to the Client3' are respectively represented by $c_1$ to $c_3$ in the following.

For still another example, in a third embodiment, it is assumed that the first network device receives two fourth service signals sent by the user terminal. The two fourth service signals are Client1 and Client2. The Client1 is a service signal whose transmission rate is 155520000 bps and coding type is an SDH, the Client2 is a service signal whose transmission rate is 322080000 bps and coding type is an SDH, and a target coding type is 64B/66B coding. Therefore, coding conversion needs to be performed on the Client1 and the Client2 based on the target coding type. To be specific, the Client1 and the Client2 are converted into service signals whose coding types are 64B/66B coding, to obtain Client1' and Client2'.

After the coding conversion is performed, a transmission rate of the Client1' is $$155520000 \times \frac{66}{64} = 160380000 \ bps,$$

and a transmission rate of the Client2' is $$622080000 \times \frac{66}{64} = 641520000 \ bps.$$

For ease of description, the transmission rates of the Client1' and the Client2' are respectively represented by $c_1$ and $c_2$ in the following.

Step 1102: The first network device inserts padding signals into the N first service signals, to obtain N second service signals that are in a one-to-one correspondence with the N first service signals, where transmission rates of the N second service signals are integer multiples of a reference rate.

It should be noted that, for the N first service signals including at least two first service signals that have different transmission rates, the N service signals can be multiplexed only when transmission rates of the N service signals have a definite hierarchical characteristic, that is, only when a ratio between the transmission rates of the N service signals has an obvious integer-ratio characteristic. In this application, the padding signals are inserted into the N first service signals, to obtain the N second service signals that are in a one-to-one correspondence with the N first service signals and whose transmission rates are integer multiples of the reference rate. This can facilitate subsequent multiplex transmission of the N first service signals, and resolve a problem of multiplexing the N first service signals.

Further, before step 1102, the reference rate may first be determined based on the transmission rates or configured rates of the N first service signals. Specifically, the reference rate may be determined in the following several implementations.

First implementation: The configured rates are determined as the reference rate.

The configured rates are rates preconfigured by a user, the first network device, or another device, for example, may be an input rate of the user, a default setting rate of the first network device, or a transmit rate of the another device. For example, in the first network device 10 shown in FIG. 5, the configured rates may be rates configured by a user by using the control unit 11.

Second implementation: The reference rate is determined based on the transmission rates of the N first service signals.

Specifically, there may be the following several manners of determining the reference rate based on the transmission rates of the N first service signals.

(1) Determine 1/T of a transmission rate of a target first service signal as the reference rate, where the target first service signal is one of the N first service signals, and T is a positive integer.

To be specific, when T=1, the transmission rate of the target first service signal may be used as the reference rate; or when T is greater than 1, 1/T of the transmission rate of the target first service signal may be used as the reference rate.

The target first service signal may randomly be selected from the N first service signals, or may be specified from the N first service signals according to a preset policy. For example, one of the N first service signals that has no signal padding unit deployed may be determined as the target first service signal.

Further, the transmission rate of the target first service signal may be rounded off according to the preset policy, and 1/T of a transmission rate obtained through round-off is determined as the reference rate. Alternatively, 1/T of the transmission rate of the target first service signal is rounded off according to the preset policy, and a processing result is determined as the reference rate. In this way, calculation complexity can be reduced, and calculation efficiency can be improved.

(2) According to a policy that a total quantity of bits of the padding signals inserted into the N first service signals is the smallest, select one service signal from the N first service signals, and use 1/T of a transmission rate of the selected service signal as the reference rate, where T is a positive integer.

Specifically, the selecting one service signal from the N first service signals according to a policy that a total quantity of bits of the padding signals inserted into the N first service signals is the smallest includes: for a first service signal B in the N first service signals, when it is assumed that 1/T of a transmission rate of the first service signal B is used as the reference rate and it is ensured the transmission rates of the N second service signals are integer multiples of the reference rate, determining a total quantity of bits of the padding signals that need to be inserted into the N first service signals within a preset time period; using the determined total quantity of bits as a padding quantity of the first service signal B; determining one first service signal with a smallest padding quantity from the padding quantity of the N first service signals; and using the first service signal with the smallest padding quantity as the selected service signal.

In other words, when it is assumed that 1/T of a transmission rate of each of the N first service signals is used as the reference rate, the total quantity of bits of the padding signals that need to be inserted into the N first service signals within the preset time period may be calculated, and the determined total quantity of bits is used as a padding quantity of the corresponding first service signals. Therefore, the padding quantity of the N first service signals may be obtained, and then 1/T of a transmission rate of a first service signal with a smallest padding quantity in the N first service signals is used as the reference rate.

The reference rate is determined according to the policy that the total quantity of bits of the padding signals inserted into the N first service signals is the smallest. This can reduce bits for inserting a padding signal and improve resource utilization of the padding signal, and can further reduce operation frequency of padding signal insertion and improve insertion efficiency.

The preset time may be preset, and may specifically be a unit time of a transmission rate. For example, the transmission rate is usually measured in bps, namely, a quantity of bits transmitted per second. Therefore, the preset time may be 1 s.

Specifically, if the preset time is a unit time of a transmission rate, when it is assumed that 1/T of the transmission rate of the first service signal B is used as the reference rate and it is ensured that the transmission rates of the N second service signals are integer multiples of the reference rate, the total quantity of bits of the padding signals that need to be inserted into the N first service signals within the preset time period, namely, the padding quantity of the first service signal B, may be determined by using the following Formula (1):

$$J_i = \sum_{j=1}^{N}\left(c_i \times \text{ceiling}\left(\frac{c_j}{c_i}\right) - c_j\right), 1 \le i \le N. \quad (1)$$

$J_i$ is the padding quantity of the first service signal B, i indicates a sequence number of the first service signal B in the N first service signals, and content in brackets indicates a quantity of bits that need to be inserted into the $j^{th}$ first service signal in the N first service signals within the preset time period. Quantities of bits that need to be inserted into each of the N first service signals within the preset time period are added, to obtain the total quantity of bits that need to be inserted into the N first service signals within the preset time period.

The first embodiment is used as an example. Assuming that 1/T of a transmission rate of one first service signal is selected from the Client1' to the Client11' as the reference rate according to a policy that a total quantity of bits of padding signals inserted into the Client1' to the Client11' is the smallest, a padding quantity of each first service signal in the Client1' to the Client11' may first be calculated. Assuming that the transmission rates of the 11 first service signals, that is, the Client1' to the Client11', are respectively represented by $c_1$ to $c_{11}$, and padding quantities of the Client1' to the Client11' are respectively represented by $J_1$ to $J_{11}$, $J_1$ to $J_{11}$ may be determined by using the following Formula (2) to Formula (5):

$$J_1 = \sum_{j=1}^{11}\left(c_1 \times \text{ceiling}\left(\frac{c_j}{c_1}\right) - c_j\right) = 137468571.4 \quad (2)$$

$$J_1 = J_2 = \ldots = J_{10} \quad (3)$$

$$J_{11} = \sum_{j=1}^{11}\left(c_{11} \times \text{ceiling}\left(\frac{c_j}{c_{11}}\right) - c_j\right) = 25889914286 \quad (4)$$

$$J_1 = J_2 = \ldots J_{10} = \min(J_1, J_2 \ldots, J_{11}). \quad (5)$$

It can be learned from the foregoing formula that $J_1 = J_2 = \ldots J_{10} = \min(J_1, J_2 \ldots, J_{11})$ In other words, padding quantities of the Client1' to the Client10' are the same and are a minimum value. Therefore, 1/T of a transmission rate of any first service signal in the Client1' to the Client10' may be used as the reference rate. For example, 1/T of the transmission rate of the Client2' may be used as the reference rate.

Further, the transmission rate of the selected service signal may be rounded off according to the preset policy, and 1/T of a transmission rate obtained through round-off is determined as the reference rate. Alternatively, 1/T of the transmission rate of the selected service signal is rounded off according to the preset policy, and a processing result is determined as the reference rate. In this way, calculation complexity can be reduced, and calculation efficiency can be improved.

Specifically, the selecting one service signal from the N first service signals according to a policy that a total quantity of bits of the padding signals inserted into the N first service signals is the smallest includes: for the first service signal B in the N first service signals, when it is assumed that 1/T of a processing result obtained by performing round-off on the transmission rate of the first service signal B according to the preset policy is used as the reference rate and it is ensured that the transmission rates of the N second service signals are integer multiples of the reference rate, determining the total quantity of bits of the padding signals that need to be inserted into the N first service signals within the preset time period; using the determined total quantity of bits as the padding quantity of the first service signal B; determining the first service signal with the smallest padding quantity from the padding quantity of the N first service signals; and using the first service signal with the smallest padding quantity as the selected service signal; or for the first service signal B in the N first service signals, when it is assumed that a processing result obtained by performing round-off on 1/T of the transmission rate of the first service signal B according to the preset policy is used as the reference rate and it is ensured that the transmission rates of the N second service signals are integer multiples of the reference rate, determining the total quantity of bits of the padding signals that need to be inserted into the N first service signals within the preset time period; using the determined total quantity of bits as the padding quantity of the first service signal B; determining the first service signal with the smallest padding quantity from the padding quantity of the N first service signals; and using the first service signal with the smallest padding quantity as the selected service signal.

(3) Select one service signal from the N first service signals according to a policy that a quantity of signal units extracted from the N second service signals is the smallest each time, when the N second service signals are multiplexed into one third service signal; and use 1/T of a transmission rate of the selected service signal as the reference rate.

Specifically, the selecting one service signal from the N first service signals according to a policy that a quantity of signal units extracted from the N second service signals is the smallest each time, when the N second service signals are multiplexed into one third service signal includes: for a first service signal B in the N first service signals, when it is assumed that 1/T of a transmission rate of the first service signal B is used as the reference rate and it is ensured that the transmission rates of the N second service signals are integer multiples of the reference rate, determining the quantity of the signal units extracted from the N second service signals each time, when the N second service signals are multiplexed into the third service signal; determining the determined quantity of the signal units as an extraction quantity of the first service signal B; and using one first service signal with a smallest extraction quantity in the N first service signals as the selected service signal.

In an embodiment, the inserting padding signals into the N first service signals, to obtain N second service signals that are in a one-to-one correspondence with the N first service signals may include: for a first service signal A in the N first service signals, inserting a padding signal into the first service signal A based on a transmission rate of the first service signal A and the reference rate, to obtain a second service signal corresponding to the first service signal A.

Specifically, the inserting a padding signal into the first service signal A based on a transmission rate of the first service signal A and the reference rate may be implemented by performing the following steps 1102a and 1102b.

Step 1102a: Determine a transmission rate of the second service signal corresponding to the first service signal A based on the transmission rate of the first service signal A and the reference rate.

It should be noted that the transmission rate of the first service signal A may be a nominal rate of the first service signal A, or may be an average rate of the first service signal A. In other words, the transmission rate of the second service signal corresponding to the first service signal A may be determined based on the nominal rate of the first service signal A and the reference rate, or may be determined based on the average rate of the first service signal A and the reference rate. This is not limited in this application.

Specifically, the determining a transmission rate of the second service signal corresponding to the first service signal A based on the transmission rate of the first service signal A and the reference rate includes the following two implementations.

Implementation 1: The transmission rate of the second service signal corresponding to the first service signal A is determined based on a first product, where the first product is a product of a relative multiple of the first service signal A and the reference rate, and the relative multiple of the first service signal A is obtained by rounding up a ratio of the transmission rate of the first service signal A to the reference rate.

Specifically, the determining the transmission rate of the second service signal corresponding to the first service signal A based on a first product may include the following two implementations.

(1) Determine the first product as the transmission rate of the second service signal corresponding to the first service signal A.

The first embodiment is used as an example. Assuming that the transmission rate of the Client2' in the Client1' to the Client11' is used as the reference rate, and transmission rates of corresponding 11 second service signals are respectively represented by $S_1$ to $S_{11}$, $S_1$ to $S_{11}$ may respectively be determined by using the following Formula (6) to Formula (8):

$$S_1 = c_2 \times \text{ceiling}\left(\frac{c_1}{c_2}\right) = c_2 = 160380000 \tag{6}$$

$$S_1 = S_2 = \ldots = S_{10} \tag{7}$$

$$S_{11} = c_2 \times \text{ceiling}\left(\frac{c_{11}}{c_2}\right) = 2886840000. \tag{8}$$

$c_1$ is the transmission rate of the Client1', $c_2$ is the transmission rate of the Client2', $c_{11}$ is the transmission rate of the Client11', and ceiling represents rounding up content in brackets.

(2) Obtain a first rate adjustment upper limit, where the first rate adjustment upper limit is predetermined based on a minimum value of allowable rate floating lower limits of the N first service signals and an allowable rate floating upper limit of the third service signal; and adjust the first product based on the first rate adjustment upper limit, to obtain the transmission rate of the second service signal corresponding to the first service signal A.

To be specific, before the transmission rates of the N second service signals that are in a one-to-one correspondence with the N first service signals are determined, the minimum value of the allowable rate floating lower limits of the N first service signals and the allowable rate floating upper limit of the third service signal may first be determined. Then, the first rate adjustment upper limit is determined based on the minimum value of the allowable rate floating lower limits of the N first service signals and the allowable rate floating upper limit of the third service signal. Afterwards, for a second service signal corresponding to each first service signal, a product of a relative multiple of each first service signal and the reference rate may be adjusted based on the first rate adjustment upper limit, to obtain a transmission rate of the second service signal corresponding to each first service signal.

To be specific, the transmission rates of the N second service signals may further be finely adjusted based on rate tolerances of the N first service signals, a rate tolerance of the third service signal, and a proportion of maintenance and management signals that need to be separately inserted into the N first service signals. In this way, specific to the determined transmission rates of the N second service signals, the rate tolerances of the first service signals and the third service signal and insertion of a specific proportion of the maintenance and management signals into the N first service signals are further allowable.

An allowable rate floating lower limit of each of the N first service signals may be determined based on a rate tolerance of the first service signal, and the allowable rate floating upper limit of the third service signal may be determined based on the rate tolerance of the third service signal.

Specifically, the determining a first rate adjustment upper limit based on a minimum value of allowable rate floating lower limits of the N first service signals and an allowable rate floating upper limit of the third service signal includes: determining a difference between the upper limit of the third service signal and the minimum value of the allowable rate floating lower limits of the N first service signals as the first rate adjustment upper limit.

Specifically, the adjusting the first product based on the first rate adjustment upper limit, to obtain the transmission rate of the second service signal corresponding to the first service signal A may include: determining a sum of the first product and a second product as the transmission rate of the second service signal corresponding to the first service signal A, where the second product is a product of the first rate adjustment upper limit and the first product.

The first embodiment is used as an example. Frequency tolerances of the Client1' to the Client10' are (+10 PPM, −10 PPM), a frequency tolerance of the Client11' is (+20 PPM, −20 PPM), and a frequency tolerance of the third service signal is (+100 PPM, −100 PPM). When no other complex factors are considered, a value of a rate tolerance is equal to that of a frequency tolerance. PPM (Part per Million) is a frequency unit, namely, 1/1000000. Assuming that the first rate adjustment upper limit is represented by $f_{max}$, $f_{max}$ may be determined by using the following Formula (9):

$$f_{max}=100-(-20)=120 \text{ PPM} \qquad (9).$$

Assuming that the transmission rate of the Client2' in the Client1' to the Client11' is used as the reference rate, and transmission rates of 11 second service signals corresponding to the Client1' to the Client11' are respectively represented by $S_1$ to $S_{11}$, $S_1$ to $S_{11}$ may respectively be determined by using the following Formula (10) to Formula (12).

$$S_1 = c_2 \times \text{ceiling}\left(\frac{c_1}{c_2}\right) \times (1 + 0.00012) \qquad (10)$$

$$S_1 = S_2 = \ldots = S_{10} \qquad (11)$$

$$S_{11} = c_2 \times \text{ceiling}\left(\frac{c_{11}}{c_2}\right) \times (1 + 0.00012). \qquad (12)$$

$c_1$ is the transmission rate of the Client1', $c_2$ is the transmission rate of the Client2', $c_{11}$ is the transmission rate of the Client11', and ceiling represents rounding up content in brackets.

Implementation 2: A second rate adjustment upper limit is obtained, where the second rate adjustment upper limit is predetermined based on a maximum value of a proportion of maintenance and management signals that need to be separately inserted into the N first service signals, or is predetermined based on a maximum value of a proportion of maintenance and management signals that need to be separately inserted into the N first service signals, a minimum value of allowable rate floating lower limits of the N first service signals, and an allowable rate floating upper limit of the third service signal; and a first product is adjusted based on the second rate adjustment upper limit, to obtain a transmission rate of a second service signal corresponding to the first service signal A, where the first product is a product of a relative multiple of the first service signal A and the reference rate, and the relative multiple of the first service signal A is obtained by rounding up a ratio of the transmission rate of the first service signal A to the reference rate.

In other words, before the transmission rates of the N second service signals that are in a one-to-one correspondence with the N first service signals are determined, the proportion of the maintenance and management signals that need to be separately inserted into the N first service signals may first be determined, and the second rate adjustment upper limit is determined based on the maximum value of the proportion of the maintenance and management signals that need to be separately inserted into the N first service signals. Alternatively, the proportion of the maintenance and management signals that need to be separately inserted into the N first service signals, the allowable rate floating lower limit of the N first service signals, and the allowable rate floating upper limit of the third service signal are first determined, and the second rate adjustment upper limit is determined based on the maximum value of the proportion of the maintenance and management signals that need to be separately inserted into the N first service signals, the minimum value of the allowable rate floating lower limits of the N first service signals, and the allowable rate floating upper limit of the third service signal. Then, for the first service signal A in the N first service signals, the product of the relative multiple of the first service signal A and the reference rate is adjusted, to obtain the transmission rate of the second service signal corresponding to the first service signal A.

A maintenance and management signal inserted into the first service signal A may carry a maintenance and management parameter used to maintain and manage the first service signal A. For example, the carried maintenance and management parameter may be clock characteristic information of the first service signal A, and is used to subsequently restore a clock of the first service signal A on a second network device side.

Specifically, the determining a second rate adjustment upper limit based on a maximum value of a proportion of maintenance and management signals that need to be separately inserted into the N first service signals includes: determining the maximum value of the proportion of the maintenance and management signals that need to be separately inserted into the N first service signals as the second rate adjustment upper limit. The determining a second rate adjustment upper limit based on a maximum value of a proportion of maintenance and management signals that need to be separately inserted into the N first service signals, a minimum value of allowable rate floating lower limits of the N first service signals, and an allowable rate floating upper limit of the third service signal includes: determining a sum of the allowable rate floating upper limit of the third service signal and the maximum value of the proportion of the maintenance and management signals that need to be separately inserted into the N first service signals, and determining a difference between the sum and the minimum value of the allowable rate floating lower limits of the N first service signals as the second rate adjustment upper limit.

The first embodiment is used as an example. It is assumed that frequency tolerances of the Client1' to the Client10' are (+10 PPM, −10 PPM), a frequency tolerance of the Client11' is (+20 PPM, −20 PPM), and a frequency tolerance of the third service signal is (+100 PPM, −100 PPM). When no other factors are considered, a value of a rate tolerance of each Client is equal to that of a frequency tolerance, and the values of the frequency tolerances can directly be used as the values of the rate tolerances. Proportions of maintenance and management signals that need to be inserted into the Client1' to the Client11' are all 50 PPM. Assuming that the second rate adjustment upper limit is represented by $f_{max}$, $f_{max}$ may be determined by using the following Formula (13):

$$f_{max}=100+50-(-20)=170 \text{ PPM} \quad (13).$$

Assuming that the Client2' in the Client1' to the Client11' is used as the reference rate, and transmission rates of 11 second service signals corresponding to the Client1' to the Client11' are respectively represented by $S_1$ to $S_{11}$, $S_1$ to $S_{11}$ may respectively be determined by using the following Formula (14) to Formula (16):

$$S_1 = c_2 \times \text{ceiling}\left(\frac{c_1}{c_2}\right) \times (1 + 0.00017) \quad (14)$$

$$S_1 = S_2 = \ldots = S_{10} \quad (15)$$

$$S_{11} = c_2 \times \text{ceiling}\left(\frac{c_{11}}{c_2}\right) \times (1 + 0.00017). \quad (16)$$

$c_1$ is the transmission rate of the Client1', $c_2$ is the transmission rate of the Client2', $c_{11}$ is the transmission rate of the Client11', and ceiling represents rounding up content in brackets.

The second embodiment is used as an example. Frequency tolerances of the Client1' to and the Client2' are (+100 PPM, −100 PPM), a frequency tolerance of the Client3' is (+20 PPM, −20 PPM), and a frequency tolerance of the third service signal is (+20 PPM, −20 PPM). When no other factors are considered, a value of a rate tolerance of each Client is equal to that of a frequency tolerance, and the values of the frequency tolerances can directly be used as the values of the rate tolerances. Proportions of maintenance and management signals that need to be inserted into the Client1' to the Client3' are all 100 PPM. Assuming that the second rate adjustment upper limit is represented by $f_{max}$, $f_{max}$ may be determined by using the following Formula (17):

$$f_{max}=20+100-(-100)=220 \text{ PPM} \quad (17).$$

Assuming that 1/10 of the transmission rate of the Client3' is used as the reference rate, and transmission rates of three second service signals corresponding to the Client1' to the Client3' are respectively represented by $S_1$ to $S_3$, $S_1$ to $S_3$ may respectively be determined by using the following Formula (18) to Formula (20):

$$S_1 = \frac{c_3}{10} \times \text{ceiling}\left(\frac{c_1}{\frac{c_3}{10}}\right) \times (1 + 0.00022) = 1031476875, \quad (18)$$

$$S_2 = \frac{c_3}{10} \times \text{ceiling}\left(\frac{c_2}{\frac{c_3}{10}}\right) \times (1 + 0.00022) = 9283291875, \quad (19)$$

$$S_3 = \frac{c_3}{10} \times \text{ceiling}\left(\frac{c_3}{\frac{c_3}{10}}\right) \times (1 + 0.00022) = 10314768750. \quad (20)$$

$c_1$ is the transmission rate of the Client1', $c_2$ is the transmission rate of the Client2', $c_3$ is the transmission rate of the Client3', and ceiling represents rounding up content in brackets.

The third embodiment is used as an example. A frequency tolerance of the Client1' is (+10 PPM, −10 PPM), a frequency tolerance of the Client2' is (+20 PPM, −20 PPM), and a frequency tolerance of the third service signal is (+100 PPM, −100 PPM). When no other factors are considered, a value of a rate tolerance of each Client is equal to that of a frequency tolerance, and the values of the frequency tolerances can directly be used as the values of the rate tolerances. Proportions of maintenance and management signals that need to be inserted into the Client1' and the Client2' are all 50 PPM. Assuming that the second rate adjustment upper limit is represented by $f_{max}$, $f_{max}$ may be determined by using the following Formula (21):

$$f_{max}=100+50-(-20)=170 \text{ PPM} \quad (21).$$

Assuming that a configured rate $C_{ref}=160380000$ bps set by the first network device is used as the reference rate, and transmission rates of two second service signals corresponding to the Client1' and the Client2' are respectively represented by $S_1$ and $S_2$, $S_1$ and $S_2$ may respectively be determined by using the following Formula (22) and Formula (23):

$$S_1 = c_{ref} \times \text{ceiling}\left(\frac{c_1}{c_{ref}}\right) \times (1 + 0.00017) = 160407264.6, \quad (22)$$

$$S_2 = c_{ref} \times \text{ceiling}\left(\frac{c_2}{c_{ref}}\right) \times (1 + 0.00017) = 641661134.4. \quad (23)$$

$c_1$ is the transmission rate of the Client1', $c_2$ is the transmission rate of the Client2', and ceiling represents rounding up content in brackets.

Step 1102b: Insert a padding signal into the first service signal A based on the transmission rate of the first service signal A and the transmission rate of the second service signal corresponding to the first service signal A, to obtain the second service signal corresponding to the first service signal A.

Specifically, the inserting a padding signal into the first service signal A based on the transmission rate of the first service signal A and the transmission rate of the second service signal corresponding to the first service signal A includes the following two implementations.

Implementation 1: When the transmission rate of the second service signal corresponding to the first service signal A is determined in Implementation 1 in step 1102a, the padding signal may be inserted into the first service signal A based on a deviation rate between the transmission rate of the second service signal corresponding to the first service signal A and the transmission rate of the first service signal A.

Specifically, when the deviation rate is greater than 0, the padding signal is inserted into the first service signal A based on the deviation rate. When the deviation rate is equal to 0, it indicates that the transmission rates of the first service signal A and the corresponding second service signal are the same. In this case, the padding signal does not need to be inserted into the first service signal A.

For example, the padding signal may be a deviation adaptation signal. In other words, the deviation adaptation signal used as the padding signal may be inserted into the first service signal A based on the deviation rate between the transmission rate of the second service signal corresponding to the first service signal A and the transmission rate of the first service signal A. For example, when no maintenance and management signal that needs to be inserted into the N first service signals is configured, only the deviation adaptation signal may be inserted into the first service signal A.

Figure 12:
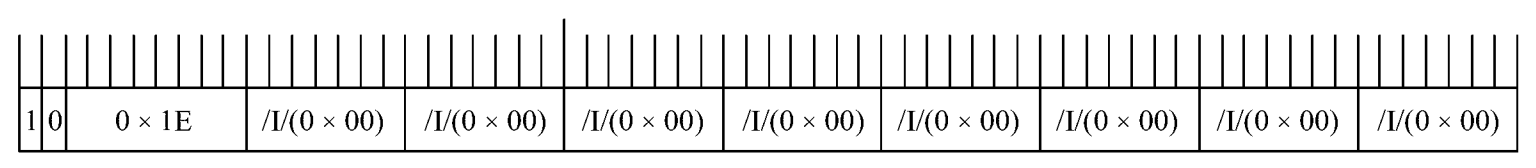

The deviation adaptation signal is used to adapt the deviation rate between the transmission rate of the first service signal A and the transmission rate of the corresponding second service signal. Therefore, after the deviation adaptation signal is inserted into the first service signal A, that a transmission rate of the obtained second service signal is equal to a predetermined transmission rate is ensured. For example, a deviation adaptation signal whose transmission rate is equal to the deviation rate may be inserted into the first service signal A. In an implementation, the deviation adaptation signal may be an idle (IDLE) code block stream, and certainly may alternatively be in another signal form. This is not limited in this application. The first embodiment is used as an example. The inserted deviation adaptation signal may be an IDLE code block stream of the 64B/66B coding, and a code block structure of an IDLE code block may be shown in FIG. 12.

Specifically, the inserting the padding signal into the first service signal A based on a deviation rate between the transmission rate of the second service signal corresponding to the first service signal A and the transmission rate of the first service signal A may include: determining X based on the transmission rate of the first service signal A, where X is a quantity of first signal units obtained in a unit time, and the first signal unit is a signal unit of the first service signal A; determining Y based on the deviation rate between the transmission rate of the second service signal corresponding to the first service signal A and the transmission rate of the first service signal A, where Y is a quantity of second signal units that need to be inserted into a group of first signal units obtained in a unit time, and the second signal unit is a signal unit of the padding signal; and in a process of obtaining a group of first signal units in each unit time, inserting Y second signal units into X first signal units obtained in each unit time.

It should be noted that a specific implementation of inserting the Y second signal units into the X first signal units obtained in each unit time is detailed in subsequent content of this application. Details are not described herein.

Implementation 2: When the transmission rate of the second service signal corresponding to the first service signal A is determined in Implementation 2 in step 1102a, the proportion of the maintenance and management signal that needs to be inserted into the first service signal A may be determined, and the padding signal may be inserted into the first service signal A based on the proportion of the maintenance and management signal that needs to be inserted into the first service signal A, the transmission rate of the first service signal A, and the transmission rate of the second service signal corresponding to the first service signal A.

Specifically, the maintenance and management signal and the deviation adaptation signal that are used as padding signals may be inserted into the first service signal A based on the proportion of the maintenance and management signal that needs to be inserted into the first service signal A, the transmission rate of the first service signal A, and the transmission rate of the second service signal corresponding to the first service signal A.

Figures 13, 14:
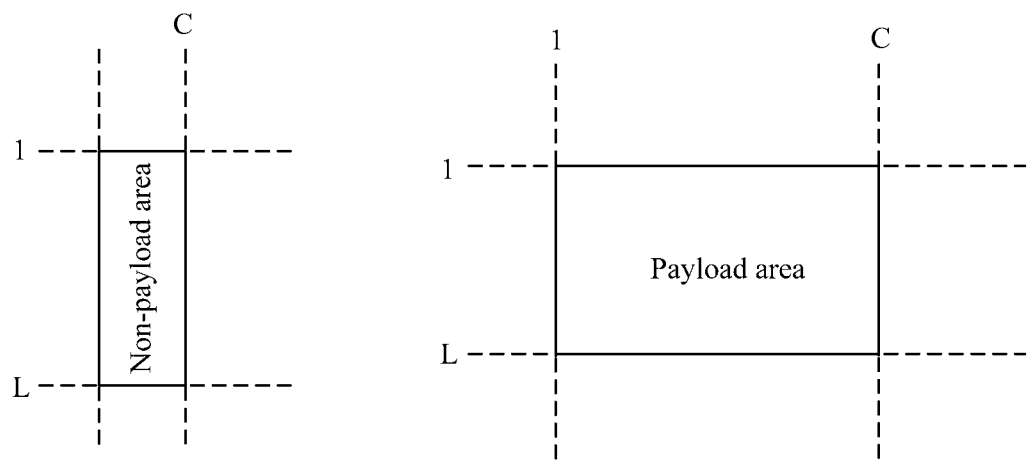
FIG. 13 is a schematic structural diagram of a code block structure of a maintenance and management signal according to this application.
FIG. 14 is a schematic diagram of a bit-based frame structure according to this application.

In other words, when maintenance and management signals that need to be inserted into the N first service signals are configured, the deviation adaptation signal and the maintenance and management signal need to be inserted into the first service signal A. The first embodiment is used as an example. Maintenance and management signals inserted into the Client1' to the Client11' may carry clock characteristic information corresponding to a first service signal, to subsequently restore a clock corresponding to the first service signal on the second network device side. For example, a coding type of the maintenance and management signals inserted into the Client1' to the Client11' may be 64B/66B coding, and in 64B/66B code blocks, a code block with a type being 4B and O equal to 0 x 8 is used to carry clock characteristic information. A code block structure of the inserted maintenance and management signal may be shown in FIG. 13.

Specifically, the inserting the maintenance and management signal and the deviation adaptation signal that are used as padding signals into the first service signal A based on the proportion of the maintenance and management signal that needs to be inserted into the first service signal A, the transmission rate of the first service signal A, and the transmission rate of the second service signal corresponding to the first service signal A may include: first inserting the maintenance and management signal into the first service signal A based on the proportion of the maintenance and management signal that needs to be inserted into the first service signal A; then determining, based on the transmission rate of the first service signal A and the proportion of the maintenance and management signal to be inserted into the first service signal A, a transmission rate of the first service signal A into which the maintenance and management signal has been inserted; and finally inserting the deviation adaptation signal into the first service signal A into which the maintenance and management signal has been inserted, based on the transmission rate of the second service signal corresponding to the first service signal A and the transmission rate of the first service signal A into which the maintenance and management signal has been inserted.

Specifically, the inserting the deviation adaptation signal into the first service signal A into which the maintenance and management signal has been inserted, based on the transmission rate of the second service signal corresponding to the first service signal A and the transmission rate of the first service signal A into which the maintenance and management signal has been inserted includes: determining a deviation rate between the transmission rate of the second service signal corresponding to the first service signal A and the transmission rate of the first service signal A into which the maintenance and management signal has been inserted, and inserting the deviation adaptation signal into the first service signal A into which the maintenance and management signal has been inserted, based on the deviation rate.

Specifically, a method for inserting the deviation adaptation signal into the first service signal A into which the maintenance and management signal has been inserted, based on the deviation rate between the transmission rate of the second service signal corresponding to the first service signal A and the transmission rate of the first service signal A into which the maintenance and management signal has been inserted, is similar to a method for inserting the padding signal into the first service signal A based on the deviation rate between the transmission rate of the second service signal corresponding to the first service signal A and the transmission rate of the first service signal A. For a specific implementation process, refer to the implementation process of inserting the padding signal into the first service signal A based on the deviation rate between the transmission rate of the second service signal corresponding to the first service signal A and the transmission rate of the first service signal A. Details are not described again in this application.

The following details a manner of inserting the padding signal into the first service signal A.

In an embodiment, an implementation process of inserting the padding signal into the first service signal A based on the transmission rate of the first service signal A and the reference rate may include: determining X based on the transmission rate of the first service signal A, where X is a quantity of first signal units obtained in a unit time, and the first signal unit is a signal unit of the first service signal A; determining Y based on the transmission rate of the first service signal A and the reference rate, where Y is a quantity of second signal units that need to be inserted into a group of first signal units obtained in a unit time, and the second signal unit is a signal unit of the padding signal; and in a process of obtaining a group of first signal units in each unit time, inserting Y second signal units into X first signal units obtained in each unit time.

The unit time may be determined based on a transmission rate. For example, when the transmission rate is measured in bps, the unit time may be one second. That the unit time is one second means that a group of first signal units are obtained every other second, and Y second signal units are inserted into X first signal units obtained per second. Both the signal unit of the first service signal A and the signal unit of the padding signal may be bit blocks, for example, may be M/N bit blocks. The padding signal may be a deviation adaptation signal.

Specifically, the determining Y based on the transmission rate of the first service signal A and the reference rate includes: determining Y based on the deviation rate between the transmission rate of the second service signal corresponding to the first service signal A and the transmission rate of the first service signal A. The transmission rate of the second service signal corresponding to the first service signal A is predetermined based on the transmission rate of the first service signal A and the reference rate.

In a possible embodiment, the transmission rate of the first service signal A may be determined as X, and the deviation rate between the transmission rate of the second service signal corresponding to the first service signal A and the transmission rate of the first service signal A is determined as Y. For example, assuming that the transmission rate of the first service signal A is 100 bps and the deviation rate is 15 bps, X is 100 and Y is 15.

Specifically, the inserting Y second signal units into X first signal units obtained in each unit time includes the following several implementations.

(1) In a process of obtaining a group of first signal units in a current unit time, when X first signal units are obtained, insert Y second signal units after the obtained X first signal units.

For example, assuming that X is 100 and Y is 15, in a process of obtaining a group of first signal units in a current unit time, when 100 first signal units are obtained, 15 second signal units may be inserted after the obtained 100 first signal units.

When insertion is performed in the implementation (1), operations of obtaining a first signal unit and inserting a second signal unit need to be performed only once in each unit time. In this way, a quantity of signal obtaining and insertion times can be reduced, an operation is simple, and insertion efficiency is relatively high.

(2) When X is greater than or equal to Y, round up a ratio of X to Y to obtain R; in a process of obtaining a group of first signal units in a current unit time, each time R first signal units are obtained, insert one second signal unit after the obtained R first signal units; and when last S first signal units are obtained in the current unit time, insert one second signal unit after the obtained last S first signal units, where S is less than or equal to R.

In other words, R is equal to $$\operatorname{ceiling}\left(\frac{X}{Y}\right).$$

For example, when X is 100 and Y is 15, R is 7. When X is 100, Y is 15, and R is 7, in a process of obtaining a group of first signal units in a current unit time, each time seven first signal units are obtained, one second signal unit may be inserted after the obtained seven first signal units; and when last two first signal units are obtained, one second signal unit is inserted after the obtained two signal units. In this way, insertion of a padding signal in a current unit time can be completed.

It can be learned from the foregoing that, in the implementation (2), when X is greater than or equal to Y, the to-be-inserted second signal units can be inserted into the first signal units relatively evenly, and this can ensure that a transmission rate of the second service signal obtained after the second signal units are inserted satisfies a rate requirement.

(3) When X is less than Y, round up a ratio of Y to X to obtain P; in a process of obtaining a group of first signal units in a current unit time, each time one first signal unit is obtained, insert P second signal units after the obtained first signal unit; and when the last first signal unit is obtained in the current unit time, insert P second signal units after the obtained first signal unit.

In other words, P is equal to $$\operatorname{ceiling}\left(\frac{Y}{X}\right).$$

For example, when X is 15 and Y is 100, P is 7, in a process of obtaining a group of first signal units in a current unit time, each time one first signal unit is obtained, seven second signal units may be inserted after the obtained first signal unit; and when the last first signal unit is obtained, two second signal units are inserted after the obtained first signal unit.

It can be learned from the foregoing that, in the implementation (3), when X is less than Y, the to-be-inserted second signal units can be inserted into the first signal units relatively evenly, and this can ensure that a transmission rate of the second service signal obtained after the second signal units are inserted satisfies a rate requirement.

(4) When X is greater than or equal to Y, round down a ratio of X to Y to obtain E; determine, based on Y and a remainder that is obtained by dividing X by Y, whether a quantity of first signal units obtained each time in a unit time is E or E+1; and based on the determined quantity, obtain a first signal unit for Y times in a current unit time, and insert one second signal unit after the first signal unit obtained each time.

In the implementation (4), when X is greater than or equal to Y, a smaller Y may be determined as a quantity of times of obtaining the first signal units in a unit time, that is, obtaining the first signal units for Y times in a unit time. In addition, each time after an obtaining operation is performed, one second signal unit needs to be inserted after an obtained first signal unit, to implement an operation of inserting a total of Y second signal units, so that a transmission rate of the second service signal obtained after the insertion satisfies a rate requirement.

A quantity of first signal units obtained each time may be E or E+1. Specifically, whether the quantity of first signal units obtained each time is E or E+1 may be determined based on Y and the remainder that is obtained by dividing X by Y. Specifically, whether the quantity of first signal units obtained each time in the unit time is E or E+1 may be determined based on the remainder obtained by dividing X by Y, Y, and the obtaining times of obtaining the first signal units each time in the unit time.

In a possible embodiment, whether the quantity of first signal units obtained each time in the unit time is E or E+1 may be determined based on the remainder obtained by dividing X by Y, Y, and the obtaining times of obtaining the first signal units each time in the unit time, by using the following Formula (24):

$$\begin{cases} \text{When } Z(i) \geq G, H(i) = E \\ \text{When } Z(i) < G, H(i) = E + 1 \end{cases} \quad (24)$$

i=1, 2, ..., Y; H(i) indicates a quantity of first signal units obtained for the $i^{th}$ time in a unit time; G is the remainder obtained by dividing X by Y, that is, G=mod(X, Y); and Z(i)=mod(i×G, Y).

E is equal to floor $$\left(\frac{Y}{X}\right).$$

For example, when X is 100 and Y is 15, E is 6. When X is 100, Y is 15, and E is 6, it may be determined that first signal units may be obtained for 15 times in a unit time, and six or seven first signal units are obtained each time. Each time six or seven first signal units are obtained, one second signal unit is inserted after the obtained first signal units. Specifically, whether six or seven first signal units are obtained each time may be determined according to the foregoing Formula (24).

For example, when X is 100 and Y is 15, specific values are as follows: H(1)=6, H(2)=7, H(3)=7, H(4)=6, H(5)=7, H(6)=7, H(7)=6, H(8)=7, H(9)=7, H(10)=6, H(11)=7, H(12)=7, H(13)=6, H(14)=7, and H(15)=7.

To be specific, signal units are obtained for 15 times in each unit time. A specific obtaining and insertion procedure is as follows, and the following procedure may cyclically be performed:

obtaining six first signal units at the first time, and inserting one second signal unit;

obtaining seven first signal units at the second time, and inserting one second signal unit;

obtaining seven first signal units at the third time, and inserting one second signal unit;

obtaining six first signal units at the fourth time, and inserting one second signal unit;

obtaining seven first signal units at the fifth time, and inserting one second signal unit;

obtaining seven first signal units at the sixth time, and inserting one second signal unit;

obtaining six first signal units at the seventh time, and inserting one second signal unit;

obtaining seven first signal units at the eighth times, and inserting one second signal unit;

obtaining seven first signal units at the ninth time, and inserting one second signal unit;

obtaining six first signal units at the tenth time, and inserting one second signal unit;

obtaining seven first signal units at the eleventh time, and inserting one second signal unit;

obtaining seven first signal units at the twelfth time, and inserting one second signal unit;

obtaining six first signal units at the thirteenth time, and inserting one second signal unit;

obtaining seven first signal units at the fourteenth time, and inserting one second signal unit; and obtaining seven first signal units at the fifteenth time, and inserting one second signal unit.

It can be learned from the foregoing that, in the implementation (4), when X is greater than or equal to Y, the to-be-inserted second signal units can also be inserted into the first signal units relatively evenly, and this can ensure that a transmission rate of the second service signal obtained after the second signal units are inserted satisfies a rate requirement.

(5) When X is less than Y, round down a ratio of Y to X to obtain F; determine, based on X and a remainder that is obtained by dividing Y by X, whether a quantity of second signal units inserted after one first signal unit obtained each time in a unit time is F or F+1; and obtain a first signal unit for X times in a current unit time, and insert, based on the determined quantity, a second signal unit after one signal unit obtained each time.

In the implementation (5), when X is less than Y, a smaller X may be determined as a quantity of times of obtaining the first signal units in a unit time, that is, obtaining the first signal units for X times in a unit time, and one first signal unit is obtained each time. In addition, each time after an obtaining operation is performed, a second signal unit further needs to be inserted after an obtained first signal unit, and a total of Y second signal units need to be inserted, so that a rate requirement can be satisfied.

Each time after an obtaining operation is completed, a corresponding second signal unit needs to be inserted after one first signal unit obtained each time. In this implementation, F or F+1 second signal units may be inserted each time. Specifically, whether the quantity of second signal units inserted each time is F or F+1 may be determined based on X and the remainder that is obtained by dividing Y by X. Specifically, whether the quantity of second signal units inserted after one first signal unit obtained each time in the unit time is F or F+1 may be determined based on the remainder obtained by dividing Y by X, X, and the obtaining times of obtaining the first signal unit each time in the unit time.

In a possible embodiment, whether the quantity of second signal units inserted after one first signal unit obtained each time in the unit time is F or F+1 may be determined based on the remainder obtained by dividing Y by X, Y, and the obtaining times of obtaining the first signal unit each time in the unit time, by using the following Formula (25).

$$\begin{cases} \text{When } K(j) \geq O, L(j) = F \\ \text{When } K(j) < O, L(j) = F + 1 \end{cases} \quad (25)$$

j=1, 2, . . . , X; L(j) indicates a quantity of second signal units inserted after one first signal unit obtained at the $j^{th}$ time in a unit time; O is the remainder obtained by dividing X by Y, that is, O=mod(Y, X); and K(j)=mod(j×O, X).

F is equal to floor $$\left(\frac{Y}{X}\right).$$

For example, when X is 15 and Y is 100, F is 6. When X is 100, Y is 15, and F is 6, it may be determined that first signal units may be obtained for 15 times in a unit time, and one first signal unit is obtained each time. Each time one first signal unit is obtained, six or seven second signal units need to be inserted after the obtained first signal unit. Specifically, whether six or seven second signal units are inserted each time may be determined according to the foregoing Formula (25).

For example, when X is 15 and Y is 100, specific values are as follows: L(1)=6, L(2)=7, L(3)=7, L(4)=6, L(5)=7, L(6)=7, L(7)=6, L(8)=7, L(9)=7, L(10)=6, L(11)=7, L(12)=7, L(13)=6, L(14)=7, and L(15)=7.

To be specific, signal units are obtained for 15 times in each unit time. A specific obtaining and insertion procedure is as follows, and the following procedure may cyclically be performed:

obtaining one first signal unit at the first time, and inserting six second signal units;

obtaining one first signal unit at the second time, and inserting seven second signal units;

obtaining one first signal unit at the third time, and inserting seven second signal units;

obtaining one first signal unit at the fourth time, and inserting six second signal units;

obtaining one first signal unit at the fifth time, and inserting seven second signal units;

obtaining one first signal unit at the sixth time, and inserting seven second signal units;

obtaining one first signal unit at the seventh time, and inserting six second signal units;

obtaining one first signal unit at the eighth time, and inserting seven second signal units;

obtaining one first signal unit at the ninth time, and inserting seven second signal units;

obtaining one first signal unit at the tenth time, and inserting six second signal units;

obtaining one first signal unit at the eleventh time, and inserting seven second signal units;

obtaining one first signal unit at the twelfth time, and inserting seven second signal units;

obtaining one first signal unit at the thirteenth time, and inserting six second signal units;

obtaining one first signal unit at the fourteenth time, and inserting seven second signal units; and obtaining one first signal unit at the fifteenth time, and inserting seven second signal units.

It can be learned from the foregoing that, in the implementation (5), when X is less than Y, the to-be-inserted second signal units can be inserted into the first signal units relatively evenly, and this can ensure that a transmission rate of the second service signal obtained after the second signal units are inserted satisfies a rate requirement.

Step 1103: The first network device multiplexes the N second service signals into one third service signal, and sends the third service signal to a second network device.

Specifically, the multiplexing the N second service signals into one third service signal includes: successively extracting, based on a ratio of transmission rates between the N second service signals, signal units from the N second service signals, and forming one third service signal by using the successively extracted signal units. The signal unit may be a bit block.

The first embodiment is used as an example. A ratio of transmission rates between the 11 second service signals corresponding to the Client1' to the Client11' is 1:1: . . . :18. Therefore, one bit block may separately be extracted from first 10 second service signals each time based on the ratio between the transmission rates of the 11 second service signals, 18 bit blocks are extracted from the 11 second service signals, and then the successively extracted bit blocks form one third service signal.

Further, the N second service signals may be multiplexed into one third service signal on a communications channel supported by the first network device, and the third service signal is sent to the second network device through the communications channel. A bandwidth of the communications channel is greater than or equal to a sum of the transmission rates of the N second service signals. In other words, multiplex transmission of the N second service signals may be performed through a high-speed channel, thereby improving signal carrying efficiency of the communications channel, and reducing occupied transmission resources.

Further, the multiplexing the N second service signals into one third service signal, and sending the third service signal to a second network device may further include: separately occupying, by the N second service signals, timeslots that are in the communications channel and that are corresponding to the ratio between the transmission rates of the N second service signals. The first embodiment is used as an example. If the ratio between the transmission rates of the 11 second service signals corresponding to the Client1' to the Client11' is 1:1: . . . :18, a ratio of timeslots respectively occupied by the 11 second service signals may be 1:1: . . . :18 in the communications channel.

In a related technology, in FlexE-based networking, a FlexE channel carrying a service signal is Z timeslots of 5 Gbps/25 Gbps ($Z \geq 1$). In other words, a bandwidth of the FlexE channel carrying the service signal is Z×5 Gbps or Z×25 Gbps. Therefore, it can be learned that a minimum bandwidth of the FlexE channel is 5 Gbps, and the FlexE channel of 5 Gbps may be used to transmit a service signal whose transmission rate is less than or equal to 5 Gbps. For the FlexE channel of 5 Gbps, when a service signal whose transmission rate is 1 Gbps is transmitted through the FlexE channel, signal carrying efficiency of the communications channel is 20%. In this case, carrying efficiency is relatively low, and transmission resources are wasted. However, in the method provided in this application, for a plurality of service signals with a relatively low transmission rate, the plurality of service signals may be uniformly multiplexed and transmitted through a high-speed FlexE channel, thereby improving signal carrying efficiency of the FlexE channel, and reducing occupied transmission resources.

In addition, it should be noted that a coding type of the N second service signals may be M/N bit block coding, and a coding type of the third service signal is not limited to the coding type of the N second service signals and may be any bit-based construction. Specifically, the coding type of the third service signal may be M/N bit block coding that is the same as the coding type of the N second service signals, or may be a bit-based frame structure. The bit-based frame structure can flexibly be combined by one or more non-payload areas and one or more payload areas. A row (L) and a column (C) of each of the one or more non-payload areas and the one or more payload areas can flexibly be set, and a transmission period can also be flexibly set. The bit-based frame structure may specifically be shown in FIG. 14. For example, if one non-payload area with C=9×8 and L=9×8 and one payload area with C=261×8 and L=9×8 are configured for the bit-based frame structure, and the non-payload area is before the payload area, the bit-based frame structure is an STM-1 frame structure of an SDH. If one non-payload area with C=16×8 and L=4×8 and one payload area with C=3808×8 and L=4×8 are configured for the bit-based frame structure, and the non-payload area is before the payload area, the bit-based frame structure is an ODU frame structure of an OTN.

Figure 15:
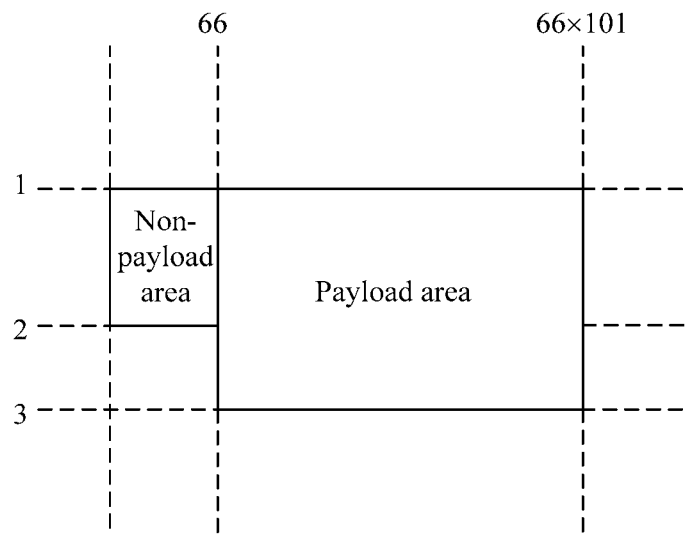
FIG. 15 is a schematic diagram of another bit-based frame structure according to this application.

The second embodiment is used as an example. A coding type of a third service signal formed by multiplexing the Client1' to the Client3' may be a bit-based frame structure. One non-payload area with C=66 and L=2 and one payload area with C=66×100 and L=3 may be configured for the bit-based frame structure, and the non-payload area is before the payload area. This is specifically shown in FIG. 15. In addition, during multiplex transmission, one, nine, and ten 66-bit blocks may respectively be extracted from the Client1' to the Client3' each time and successively placed the bit blocks in the payload area of the bit-based frame structure shown in FIG. 15. A transmission period T of the bit-based frame structure may be as follows:

$$T = \frac{\text{Size of a payload area}}{S_1 + S_2 + S_3} = \frac{66 \times 100 \times 3}{1031476875 + 9283291875 + 10314768750} = 2.56 \times 10^{-6} \text{ s.} \quad (26)$$

Further, when a specific factor changes, the service transmission procedure in this application further needs to be restarted. For example, control logic of the control unit in FIG. 5 is restarted. The specific factor includes but is not limited to the following:

(1) the reference rate changes; for example, when the reference rate is specified by a user by using the control unit, or when a user modifies a reference rate, the service transmission procedure in this application may be restarted;

(2) at least one first service signal is added or at least one first service signal is deleted based on the N first service signals;

(3) the transmission rates or rate tolerances of the N first service signals change;

(4) the rate tolerance of the third service signal changes; and (5) a proportion of the maintenance and management signal changes.

Step 1104: The second network device receives the third service signal sent by the first network device.

Step 1105: The second network device demultiplexes the third service signal into the N second service signals according to a multiplexing rule of the N second service signals.

For example, when the first network device successively extracts the signal units from the N second service signals based on the ratio between the transmission rates of the N second service signals, and forms one third service signal by using the successively extracted signal units, the second network device may successively extract the signal units from the third service signal based on the ratio between the transmission rates of the N second service signals, and combine the signal units extracted each time, to obtain the N second service signals.

Step 1106: The second network device deletes the padding signals from the N second service signals obtained through demultiplexing, to obtain the N first service signals.

In other words, for a second service signal C in the N second service signals obtained through demultiplexing, a padding signal may be deleted from the second service signal C, to obtain a first service signal corresponding to the second service signal C.

Specifically, when the second service signal C is obtained by inserting a deviation adaptation signal used as the padding signal into the first service signal corresponding to the second service signal C, the deviation adaptation signal may be deleted from the second service signal C, to obtain the first service signal corresponding to the second service signal C.

When the second service signal C is obtained by inserting the deviation adaptation signal and the maintenance and management signal that are used as padding signals into the first service signal corresponding to the second service signal C, and when the maintenance and management signal is proportionally inserted into the first service signal corresponding to the second service signal C, the deviation adaptation signal is deleted from the second service signal C. The maintenance and management signal is extracted, based on the proportion of the maintenance and management signal inserted into the first service signal corresponding to the second service signal C, from the second service signal C from which the deviation adaptation signal has been deleted. The second service signal C from which the deviation adaptation signal has been deleted and the maintenance and management signal has been extracted is determined as the first service signal corresponding to the second service signal C.

In addition, after the maintenance and management signal is extracted from the second service signal C from which the deviation adaptation signal has been deleted, the first service signal corresponding to the second service signal C may further be maintained and managed based on maintenance and management information carried in the maintenance and management signal. For example, when the maintenance and management signal carries clock characteristic information, a clock of the first service signal corresponding to the second service signal C may be restored based on the clock characteristic information.

In this application, for the N first service signals that have a same coding type and in which the at least two first service signals have different transmission rates, the padding signals may be inserted into the N first service signals, to obtain the N second service signals that are in a one-to-one correspondence with the N first service signals. Then, the N second service signals are multiplexed into one third service signal, and the third service signal is sent to the second network device. The transmission rates of the N second service signals are integer multiples of the reference rate. In other words, the transmission rates of the N second service signals have an obvious integer-ratio characteristic. The padding signals are inserted into the N first service signals, to obtain the N second service signals whose corresponding transmission rates have the obvious integer-ratio characteristic. This can facilitate subsequent multiplex transmission of the N second service signals that have the obvious integer-ratio characteristic, and resolve a problem of multiplexing service signals with different transmission rates. The N second service signals obtained by performing padding on the N first service signals are multiplexed into one third service signal. This implements multiplex transmission of the N first service signals. In comparison with a separate transmission manner in a related technology, in this application, service signal transmission efficiency is improved, and occupied transmission resources are reduced.

Figure 16:
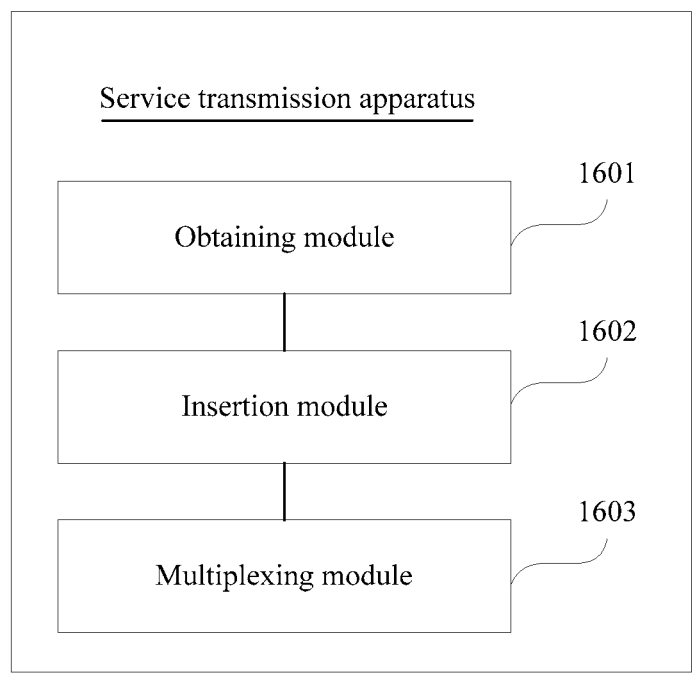
FIG. 16 is a schematic structural diagram of a service signal transmission apparatus according to this application.

FIG. 16 is a schematic structural diagram of a service signal transmission apparatus according to this application. The apparatus may be the foregoing first network device. Referring to FIG. 16, the apparatus includes:

an obtaining module 1601, configured to perform step 1101 in the embodiment in FIG. 11;

an insertion module 1602, configured to perform step 1102 in the embodiment in FIG. 11; and a multiplexing module 1603, configured to perform step 1103 in the embodiment in FIG. 11.

Optionally, the insertion module 1602 includes:

a first insertion unit, configured to: for a first service signal A in the N first service signals, insert a padding signal into the first service signal A based on a transmission rate of the first service signal A and the reference rate, to obtain a second service signal corresponding to the first service signal A.

Optionally, the first insertion module includes:

a first determining subunit, configured to determine X based on the transmission rate of the first service signal A, where X is a quantity of first signal units obtained in a unit time, and the first signal unit is a signal unit of the first service signal A;

a second determining subunit, configured to determine Y based on the transmission rate of the first service signal A and the reference rate, where Y is a quantity of second signal units that need to be inserted into a group of first signal units obtained in a unit time, and the second signal unit is a signal unit of the padding signal; and an insertion subunit, configured to: in a process of obtaining a group of first signal units in each unit time, insert Y second signal units into X first signal units obtained in each unit time.

Optionally, the insertion subunit is specifically configured to:

in a process of obtaining a group of first signal units in a current unit time, when X first signal units are obtained, insert Y second signal units after the obtained X first signal units.

Optionally, the insertion subunit is specifically configured to:

when X is greater than or equal to Y, round up a ratio of X to Y to obtain R; in a process of obtaining a group of first signal units in a current unit time, each time R first signal units are obtained, insert one second signal unit after the obtained R first signal units; and when last S first signal units are obtained in the current unit time, insert one second signal unit after the obtained last S first signal units, where S is less than or equal to R; and when X is less than Y, round up a ratio of Y to X to obtain P; in a process of obtaining a group of first signal units in a current unit time, each time one first signal unit is obtained, insert P second signal units after the obtained first signal unit; and when the last first signal unit is obtained in the current unit time, insert Q second signal units after the obtained last first signal unit, where Q is a difference between Y and a quantity of inserted second signal units in the current unit time.

Optionally, the insertion subunit is specifically configured to:

when X is greater than or equal to Y, round down a ratio of X to Y to obtain E; determine, based on Y and a remainder that is obtained by dividing X by Y, whether a quantity of first signal units obtained each time in a unit time is E or E+1; and based on the determined quantity, obtain a first signal unit for Y times in a current unit time, and insert one second signal unit after the first signal unit obtained each time; and when X is less than Y, round down a ratio of Y to X to obtain F; determine, based on X and a remainder that is obtained by dividing Y by X, whether a quantity of second signal units inserted after one first signal unit obtained each time in a unit time is F or F+1; and obtain a first signal unit for X times in a current unit time, and insert, based on the determined quantity, a second signal unit after one signal unit obtained each time.

Optionally, the insertion module further includes:

a first determining unit, configured to determine the reference rate based on transmission rates or configured rates of the N first service signals.

Optionally, the first determining unit is specifically configured to:

determine 1/T of a transmission rate of a target first service signal as the reference rate, where the target first service signal is one of the N first service signals, and T is a positive integer; or according to a policy that a total quantity of bits of padding signals inserted into the N first service signals is the smallest, select one service signal from the N first service signals, and use 1/T of a transmission rate of the selected service signal as the reference rate, where T is a positive integer.

Optionally, the insertion module includes:

a second determining unit, configured to determine, based on the transmission rate of the first service signal A and the reference rate, a transmission rate of the second service signal corresponding to the first service signal A; and a second insertion unit, configured to insert the padding signal into the first service signal A based on the transmission rate of the first service signal A and the transmission rate of the second service signal corresponding to the first service signal A, to obtain the second service signal corresponding to the first service signal A.

Optionally, the second determining unit is configured to:

determine, based on a first product, the transmission rate of the second service signal corresponding to the first service signal A, where the first product is a product of a relative multiple of the first service signal A and the reference rate, and the relative multiple of the first service signal A is obtained by rounding up a ratio of the transmission rate of the first service signal A to the reference rate.

Optionally, the second determining unit is configured to:

determine the first product as the transmission rate of the second service signal corresponding to the first service signal A; or obtain a first rate adjustment upper limit; and adjust the first product based on the first rate adjustment upper limit, to obtain the transmission rate of the second service signal corresponding to the first service signal A, where the first rate adjustment upper limit is predetermined based on a minimum value of allowable rate floating lower limits of the N first service signals and an allowable rate floating upper limit of the third service signal.

Optionally, the second determining unit is configured to:

determine a sum of the first product and a second product as the transmission rate of the second service signal corresponding to the first service signal A, where the second product is a product of the first rate adjustment upper limit and the first product.

Optionally, the apparatus further includes:

a receiving module, configured to receive N fourth service signals, where there is a fourth service signal whose coding type is different from a target coding type in the N fourth service signals, and the target coding type is the coding type of the N first service signals;

a conversion module, configured to perform, based on the target coding type, coding conversion on the fourth service signal whose coding type is different from the target coding type in the N fourth service signals; and a determining module, configured to determine a coding-converted fourth service signal and a fourth service signal whose coding type is the same as the target coding type as the N first service signals.

In this application, for the N first service signals that have a same coding type and in which the at least two first service signals have different transmission rates, the padding signals may be inserted into the N first service signals, to obtain the N second service signals that are in a one-to-one correspondence with the N first service signals. Then, the N second service signals are multiplexed into one third service signal, and the third service signal is sent to the second network device. The transmission rates of the N second service signals are integer multiples of the reference rate. In other words, the transmission rates of the N second service signals have an obvious integer-ratio characteristic. The padding signals are inserted into the N first service signals, to obtain the N second service signals whose corresponding transmission rates have the obvious integer-ratio characteristic. This can facilitate subsequent multiplex transmission of the N second service signals that have the obvious integer-ratio characteristic, and resolve a problem of multiplexing service signals with different transmission rates. The N second service signals obtained by performing padding on the N first service signals are multiplexed into one third service signal. This implements multiplex transmission of the N first service signals. In comparison with a separate transmission manner in a related technology, in this application, service signal transmission efficiency is improved, and occupied transmission resources are reduced.

Figure 17:
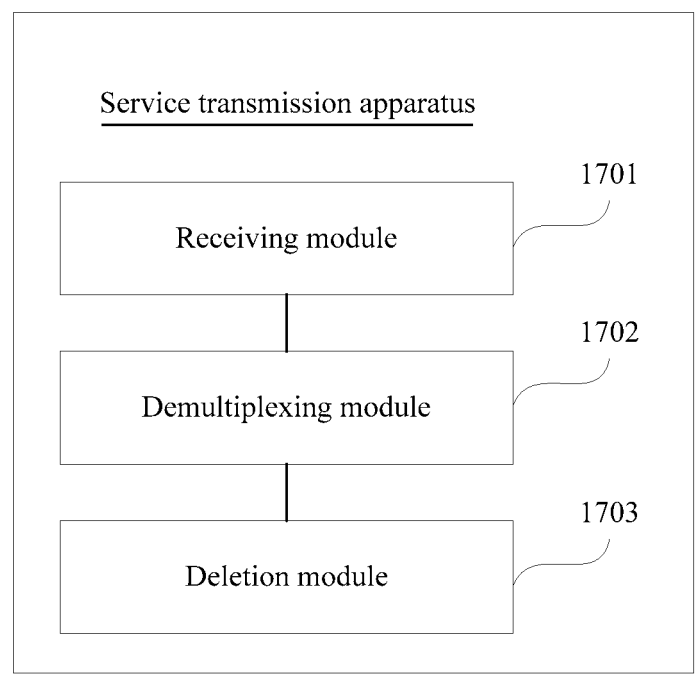
FIG. 17 is a schematic structural diagram of another service signal transmission apparatus according to this application.

FIG. 17 is a schematic structural diagram of another service signal transmission apparatus according to this application. The apparatus may be the foregoing second network device. Referring to FIG. 17, the apparatus includes:

a receiving module 1701, configured to receive a third service signal sent by a first network device, where the third service signal is formed by multiplexing N second service signals, the N second service signals are obtained by inserting padding signals into N first service signals that are in a one-to-one correspondence with the N second service signals, transmission rates of the N second service signals are integer multiples of a reference rate, coding types of the N first service signals are the same, at least two of the N first service signals have different transmission rates, and N is an integer greater than or equal to 2;

a demultiplexing module 1702, configured to demultiplex the third service signal into the N second service signals according to a multiplexing rule of the N second service signals; and a deletion module 1703, configured to delete the padding signals from the N second service signals obtained through demultiplexing, to obtain the N first service signals.

Optionally, the deletion module 1703 includes:

a first deletion unit, configured to: for a second service signal C in the N second service signals obtained through demultiplexing, when the second service signal C is obtained by inserting a deviation adaptation signal and a maintenance and management signal that are used as padding signals into a first service signal corresponding to the second service signal C, and the maintenance and management signal is proportionally inserted into the first service signal corresponding to the second service signal C, delete the deviation adaptation signal from the second service signal C;

a second deletion unit, configured to extract, based on a proportion of the maintenance and management signal inserted into the first service signal corresponding to the second service signal C, the maintenance and management signal from the second service signal C from which the deviation adaptation signal has been deleted; and a determining unit, configured to determine the second service signal C from which the deviation adaptation signal has been deleted and the maintenance and management signal has been extracted, as the first service signal corresponding to the second service signal C.

In this embodiment of the present invention, according to a multiplexing rule of the N first service signals, the third service signal is demultiplexed and the padding signals are deleted from the service signals obtained through demultiplexing. In this way, the N first service signals can successfully be restored from the third service signal used for multiplex transmission, and a multiplex reception problem is resolved, thereby improving service signal transmission efficiency, and reducing occupied transmission resources.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer instruction is loaded and executed on a computer, the procedure or functions according to this application are all or partially generated. The computer may be a general-purpose computer, a dedicated computer, a computer network, or another programmable apparatus. The computer instruction may be stored in a computer readable storage medium or may be transmitted from a computer readable storage medium to another computer readable storage medium. For example, the computer instruction may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (Digital Versatile Disc, DVD)), a semiconductor medium (for example, a solid-state drive (Solid State Disk, SSD)), or the like.

This application further provides a computer storage medium, configured to store a computer software instruction used to implement the service transmission method in FIG. 11. The computer software instruction includes a program designed for performing the foregoing method embodiment. Service data required for developing an application can be obtained by executing the stored program.

A person of ordinary skill in the art can understand that all or some of the steps of the embodiments may be implemented by hardware or a program instructing related hardware. The program may be stored in a computer readable storage medium. The storage medium may be a read-only memory, a magnetic disk, an optical disc, or the like.

The foregoing descriptions are merely example embodiments of this application, but are not intended to limit this application. Any modification, equivalent replacement, or improvement made without departing from the spirit and principle of this application should fall within the protection scope of this application.

What is claimed is:

1. A service signal transmission method, applied to a first network device, wherein the method comprises:
   obtaining N first service signals, wherein coding types of the N first service signals are the same, at least two of the N first service signals have different transmission rates, and N is an integer greater than or equal to 2;
   inserting padding signals into the N first service signals, to obtain N second service signals that are in a one-to-one correspondence with the N first service signals, wherein transmission rates of the N second service signals are integer multiples of a reference rate; and
   multiplexing the N second service signals into one third service signal, and sending the third service signal to a second network device, wherein
   before the inserting padding signals into the N first service signals, the method further comprises:
   determining the reference rate based on transmission rates of configured rates of the N first service signals, and wherein the determining the reference rate based on transmission rated of the N first service signals comprises:
   determining 1/T of a transmission rate of a target first service signal as the reference rate, wherein the target first service signal is one of the N first service signals, and T is a positive integer; or
   according to a policy that a total quantity of bits of the padding signals inserted into the N first service signals is the smallest, selecting one service signal from the N first service signals, and using 1/T of a transmission rate of the selected service signal as the reference rate, wherein T is a positive integer.

2. The method according to claim 1, wherein the inserting padding signals into the N first service signals, to obtain N second service signals that are in a one-to-one correspondence with the N first service signals comprises:
   for a first service signal A in the N first service signals, inserting a padding signal into the first service signal A based on a transmission rate of the first service signal A and the reference rate, to obtain a second service signal corresponding to the first service signal A.

3. A service signal transmission method, applied to a first network device, wherein the method comprises:
   obtaining N first service signals, wherein coding types of the N first service signals are the same, at least two of the N first service signals have different transmission rates, and N is an integer greater than of equal to 2;
   inserting padding signals into the N first service signals, to obtain N second service signals that are in a one-to-one correspondence with the N first service signals, wherein transmission rates of the N second service signals are integer multiples of a reference rate; and
   multiplexing the N second service signals into one third service signal, and sending the third service signal to a second network device,
   wherein the inserting padding signals into the N first service signals, to obtain N second service signals that are in a one-to-one correspondence with the N first service signals comprises:
   for a first service signal A in the N first service signals, inserting a padding signal into the first service signal A based on a transmission rate of the first service signal A and the reference rate, to obtain a second service signal corresponding to the first service signal A, wherein the inserting a padding signal into the first service signal A based on a transmission rate of the first service signal A and the reference rate, to obtain a second service signal corresponding to the first service signal A comprises:
   determining X based on the transmission rate of the first service signal A, wherein X is a quantity of first signal units obtained in a unit time, and the first signal unit is a signal unit of the first service signal A;
   determining Y based on the transmission rate of the first service signal A and the reference rate, wherein Y is a quantity of second signal units that need to be inserted into a group of first signal units obtained in a unit time, and the second signal unit is a signal unit of the padding signal; and
   in a process of obtaining a group of first signal units in each unit time, inserting Y second signal units into X first signal units obtained in each unit time.

4. The method according to claim 3, wherein the inserting Y second signal units into X first signal units obtained in each unit time comprises:
   in a process of obtaining a group of first signal units in a current unit time, when X first signal units are obtained, inserting Y second signal units after the obtained X first signal units.

5. The method according to claim 3, wherein the inserting Y second signal units into X first signal units obtained in each unit time comprises:
- when X is greater than or equal to Y, rounding up a ratio of X to Y to obtain R; in a process of obtaining a group of first signal units in a current unit time, each time R first signal units are obtained, inserting one second signal unit after the obtained R first signal units; and when last S first signal units are obtained in the current unit time, inserting one second signal unit after the obtained last S first signal units, wherein S is less than or equal to R; and
- when X is less than Y, rounding up a ratio of Y to X to obtain P; in a process of obtaining a group of first signal units in a current unit time, each time one first signal unit is obtained, inserting P second signal units after the obtained first signal unit; and when the last first signal unit is obtained in the current unit time, inserting Q second signal units after the obtained last first signal unit, wherein Q is a difference between Y and a quantity of inserted second signal units in the current unit time.

6. The method according to claim 3, wherein the inserting Y second signal units into X first signal units obtained in each unit time comprises:
- when X is greater than or equal to Y, rounding down a ratio of X to Y to obtain E; determining, based on Y and a remainder that is obtained by dividing X by Y, whether a quantity of first signal units obtained each time in a unit time is E or E+1; and based on the determined quantity, obtaining a first signal unit for Y times in a current unit time, and inserting one second signal unit after the first signal unit obtained each time; and
- when X is less than Y, rounding down a ratio of Y to X to obtain F; determining, based on X and a remainder that is obtained by dividing Y by X, whether a quantity of second signal units inserted after one first signal unit obtained each time in a unit time is F or F+1; and obtaining a first signal unit for X times in a current unit time, and inserting, based on the determined quantity, a second signal unit after one signal unit obtained each time.

7. A service signal transmission method, applied to a first network device, wherein the method comprises:
- obtaining N first signals, wherein coding types of the N first service signals are the same, at least two of the N first service signals have different transmission rates, and N is an integer greater than or equal to 2;
- inserting padding signals into the N first service signals, to obtain N second service signals that are in a one-to-one correspondence with the N first service signals, wherein transmission rates of the N second service signals are integer multiples of a reference rate; and
- multiplexing the N second service signals into one third service signal, and sending the third service signal to a second network device,
- wherein the inserting padding signals into the N first service signals, to obtain N second service signals that are in a one-to-one correspondence with the N first service signals comprises:
- for a first service signal A in the N first service signals, inserting a padding signal into the first service signal A based on a transmission rate of the first service signal A and the reference rate, to obtain a second service signal corresponding to the first service signal A,
- wherein the inserting a padding signal into the first service signal A based on a transmission rate of the first service signal A and the reference rate, to obtain a second service signal corresponding to the first service signal A comprises:
- determining, based on the transmission rate of the first service signal A and the reference rate, a transmission rate of the second service signal corresponding to the first service signal A; and
- inserting the padding signal into the first service signal A based on the transmission rate of the first service signal A and the transmission rate of the second service signal corresponding to the first service signal A, to obtain the second service signal corresponding to the first service signal A.

8. The method according to claim 7, wherein the determining, based on the transmission rate of the first service signal A and the reference rate, a transmission rate of the second service signal corresponding to the first service signal A comprises:
- determining, based on a first product, the transmission rate of the second service signal corresponding to the first service signal A, wherein the first product is a product of a relative multiple of the first service signal A and the reference rate, and the relative multiple of the first service signal A is obtained by rounding up a ratio of the transmission rate of the first service signal A to the reference rate.

9. The method according to claim 8, wherein the determining, based on a first product, the transmission rate of the second service signal corresponding to the first service signal A comprises:
- determining the first product as the transmission rate of the second service signal corresponding to the first service signal A; or
- obtaining a first rate adjustment upper limit; and adjusting the first product based on the first rate adjustment upper limit, to obtain the transmission rate of the second service signal corresponding to the first service signal A, wherein the first rate adjustment upper limit is predetermined based on a minimum value of allowable rate floating lower limits of the N first service signals and an allowable rate floating upper limit of the third service signal.

10. The method according to claim 9, wherein the adjusting the first product based on the first rate adjustment upper limit, to obtain the transmission rate of the second service signal corresponding to the first service signal A comprises:
- determining a sum of the first product and a second product as the transmission rate of the second service signal corresponding to the first service signal A, wherein the second product is a product of the first rate adjustment upper limit and the first product.

11. A service signal transmission method, applied to a first network device, wherein the method comprises:
- obtaining N first signals, wherein coding types of the N first service signals are the same, at least two of the N first service signals have different transmission rates, and N is an integer greater than or equal to 2;
- inserting padding signals into the N first service signals, to obtain N second service signals that are in a one-to-one correspondence with the N first service signals, wherein transmission rates of the N second service signals are integer multiples of a reference rate; and
- multiplexing the N second service signals into one third service signal, and sending the third service signal to a second network device, wherein before the obtaining N first service signals, the method further comprises:

receiving N fourth service signals, wherein there is a fourth service signal whose coding type is different from a target coding type in the N fourth service signals, and the target coding type is the coding type of the N first service signals;

performing, based on the target coding type, coding conversion on the fourth service signal whose coding type is different from the target coding type in the N fourth service signals; and determining a coding-converted fourth service signal and a fourth service signal whose coding type is the same as the target coding type as the N first service signals.

12. A service signal transmission method, applied to a second network device, wherein the method comprises:

receiving a third service signal sent by a first network device, wherein the third service signal is formed by multiplexing N second service signals, the N second service signals are obtained by inserting padding signals into N first service signals that are in a one-to-one correspondence with the N second service signals, transmission rates of the N second service signals are integer multiples of a reference rate, coding types of the N first service signals are the same, at least two of the N first service signals have different transmission rates, and N is an integer greater than or equal to 2;

demultiplexing the third service signal into the N second service signals according to a multiplexing rule of the N second service signals; and deleting the padding signals from the N second service signals obtained through demultiplexing, to obtain the N first service signals, wherein the reference rate is determined based on transmission rates or configured rates of the N first service signals, and the determination of the reference rate based on transmission rates of the N first service signals comprises:

determining 1/T of a transmission rate of a target first service signal as the reference rate, wherein the target first service signal is one of the N first service signals, and T is a positive integer; or according to a policy that a total quantity of bits of the padding signals inserted into the N first service signals is the smallest, selecting one service signal from the N first service signals, and using 1/T of a transmission rate of the selected service signal as the reference rate, wherein T is a positive integer.

13. A service signal transmission apparatus, applied to a first network device, wherein the apparatus comprises:

an obtaining circuit, configured to obtain N first service signals, wherein coding types of the N first service signals are the same, at least two of the N first service signals have different transmission rates, and N is an integer greater than or equal to 2;

an insertion circuit, configured to insert padding signals into the N first service signals, to obtain N second service signals that are in a one-to-one correspondence with the N first service signals, wherein transmission rates of the N second service signals are integer multiples of a reference rate; and a multiplexing circuit, configured to multiplex the N second service signals into one third service signal, and send the third service signal to a second network device, wherein the insertion circuit comprises a determination circuit configured to determine the reference rate based on transmission rates or configured rates of the N first service signals, and the determination of the reference rate based on the transmission rates of the N first service signals comprises:

determining 1/T of a transmission rate of a target first service signal as the reference rate, wherein the target first signal is one of the N first service signals, and T is a positive integer, or according to a policy that a total quantity of bits of the padding signals inserted into the N first service signals is the smallest, selecting one service signal from the N first service signals, and using 1/T of a transmission rate of the selected service signal as the reference rate, wherein T is a positive integer.

14. The apparatus according to claim 13, wherein the insertion circuit comprises:

a first insertion unit, configured to: for a first service signal A in the N first service signals, insert a padding signal into the first service signal A based on a transmission rate of the first service signal A and the reference rate, to obtain a second service signal corresponding to the first service signal A.

15. A service signal transmission apparatus, applied to a first network device, wherein the apparatus comprises:

an obtaining circuit, configured to obtain N first service signals, wherein coding types of the N first service signals are the same, at least two of the N first service signals have a different transmission rates, and N is an integer greater than of equal to 2;

an insertion circuit, configured to insert padding signals into the N first service signals, to obtain N second service signals that are in a one-to-one correspondence with the N first service signals, wherein transmission rates of the N second service signals are integer multiples of a reference rate; and a multiplexing circuit, configured to multiplex the N second service signals into one third service signal, and send the third service signal to a second network device, wherein the insertion circuit comprises:

a first insertion unit, configured to: for a first service signal A in the N first service signals, insert a padding signal into the first service signal A based on a transmission rate of the first service signal A and the reference rate, to obtain a second signal corresponding to the first service signal A, wherein the first insertion unit comprises:

a first determining subunit, configured to determine X based on the transmission rate of the first service signal A, wherein X is a quantity of first signal units obtained in a unit time, and the first signal unit is a signal unit of the first service signal A;

a second determining subunit, configured to determine Y based on the transmission rate of the first service signal A and the reference rate, wherein Y is a quantity of second signal units that need to be inserted into a group of first signal units obtained in a unit time, and the second signal unit is a signal unit of the padding signal; and an insertion subunit, configured to: in a process of obtaining a group of first signal units in each unit time, insert Y second signal units into X first signal units obtained in each unit time.

16. The apparatus according to claim 15, wherein the insertion subunit is further configured to:

in a process of obtaining a group of first signal units in a current unit time, when X first signal units are obtained, insert Y second signal units after the obtained X first signal units.

17. The apparatus according to claim 15, wherein the insertion subunit is further configured to:
- when X is greater than or equal to Y, round up a ratio of X to Y to obtain R; in a process of obtaining a group of first signal units in a current unit time, each time R first signal units are obtained, insert one second signal unit after the obtained R first signal units; and when last S first signal units are obtained in the current unit time, insert one second signal unit after the obtained last S first signal units, wherein S is less than or equal to R; and
- when X is less than Y, round up a ratio of Y to X to obtain P; in a process of obtaining a group of first signal units in a current unit time, each time one first signal unit is obtained, insert P second signal units after the obtained first signal unit; and when the last first signal unit is obtained in the current unit time, insert Q second signal units after the obtained last first signal unit, wherein Q is a difference between Y and a quantity of inserted second signal units in the current unit time.

18. The apparatus according to claim 15, wherein the insertion subunit is further configured to:
- when X is greater than or equal to Y, round down a ratio of X to Y to obtain E; determine, based on Y and a remainder that is obtained by dividing X by Y, whether a quantity of first signal units obtained each time in a unit time is E or E+1; and based on the determined quantity, obtain a first signal unit for Y times in a current unit time, and insert one second signal unit after the first signal unit obtained each time; and
- when X is less than Y, round down a ratio of Y to X to obtain F; determine, based on X and a remainder that is obtained by dividing Y by X, whether a quantity of second signal units inserted after one first signal unit obtained each time in a unit time is F or F+1; and obtain a first signal unit for X times in a current unit time, and insert, based on the determined quantity, a second signal unit after one signal unit obtained each time.

* * * * *

UNITED STATES PATENT AND TRADEMARK OFFICE
CERTIFICATE OF CORRECTION

PATENT NO. : 11,381,334 B2
APPLICATION NO. : 17/092208
DATED : July 5, 2022
INVENTOR(S) : Desheng Sun It is certified that error appears in the above-identified patent and that said Letters Patent is hereby corrected as shown below:

In the Claims

• Claim 1, at Column 43, Line 62, replace "of configured rates" with "or configured rates";

• Claim 1, at Column 43, Line 64, replace "rated" with "rates";

• Claim 3, at Column 44, Line 23, replace "of" with "or";

• Claim 7, at Column 45, Line 45, replace "obtaining N first signals" with "obtaining N first service signals";

• Claim 11, at Column 46, Line 54, replace "obtaining N first signals" with "obtaining N first service signals";

• Claim 13, at Column 48, Lines 5 and 6, replace "wherein the target first signal" with "wherein the target first service signal";

• Claim 15, at Column 48, Line 27, replace "have a different" with "have different";

• Claim 15, at Column 48, Line 28, replace "of" with "or"; and

• Claim 15, at Column 48, Line 44, replace "obtain a second signal" with "obtain a second service signal".

Signed and Sealed this
Second Day of August, 2022

Katherine Kelly Vidal
*Director of the United States Patent and Trademark Office*